United States Patent
Suzuki et al.

(10) Patent No.: US 7,131,048 B2
(45) Date of Patent: Oct. 31, 2006

(54) APPARATUS FOR SYSTEM DECODER AND METHOD FOR ERROR CORRECTION OF PACKET DATA

(75) Inventors: Yoshinori Suzuki, Saitama (JP); Toru Yokoyama, Kokubunji (JP); Junichi Kimura, Koganei (JP)

(73) Assignee: Hitachi, Ltd., Tokyo (JP)

( * ) Notice: Subject to any disclaimer, the term of this patent is extended or adjusted under 35 U.S.C. 154(b) by 539 days.

(21) Appl. No.: 09/940,576

(22) Filed: Aug. 29, 2001

(65) Prior Publication Data

US 2003/0014705 A1 Jan. 16, 2003

(30) Foreign Application Priority Data

Jul. 10, 2001 (JP) .............................. 2001-208680

(51) Int. Cl.
G08C 25/02 (2006.01)
H04L 1/18 (2006.01)
H03M 13/00 (2006.01)
(52) U.S. Cl. ...................................... 714/748; 714/776
(58) Field of Classification Search ................ 714/748, 714/775, 776; 375/240.27, 240.28; 348/469, 348/425.3; 370/471
See application file for complete search history.

(56) References Cited

U.S. PATENT DOCUMENTS 5,475,688 A 12/1995 Bridgewater et al.
5,737,022 A * 4/1998 Yamaguchi et al. ... 375/240.15
5,898,695 A 4/1999 Fujii et al.
5,956,102 A * 9/1999 Lane ........................ 348/425.4
6,310,884 B1 * 10/2001 Odenwald, Jr. ............. 370/412
6,530,055 B1 3/2003 Fukunaga
6,587,985 B1 7/2003 Fukushima et al.
6,744,816 B1 * 6/2004 Park et al. .................. 375/240
6,829,299 B1 * 12/2004 Chujoh et al. .............. 375/240
6,959,020 B1 10/2005 Hourunranta et al.
2001/0005385 A1 6/2001 Ichiguchi et al.

FOREIGN PATENT DOCUMENTS

| JP | 08-181983 | 12/1994 |
|----|-----------|---------|
| JP | 10-041921 | 7/1996 |
| JP | 11-331261 | 5/1998 |
| JP | 2000-253398 | 2/1999 |

* cited by examiner

*Primary Examiner*—Guy J. Lamarre
(74) *Attorney, Agent, or Firm*—Reed Smith LLP; Stanley P. Fisher, Esq.; Juan Carlos A. Marquez, Esq.

(57) ABSTRACT

When a non-error-resilient application decoder receives a data stream containing syntax error due to transmission errors, such as packet losses in wireless communication, an application decoder cannot usually continue decoding the stream data anymore. According to the present invention, the data stream containing syntax error along with error correction data generated by error-detectable transmission system is inputted into an error correction part before inputted into the application decoder. The error correction part detects the error position in the data stream using the error detection data, corrects the syntax error in the stream data, and generates a stream data which is possible to be decoded by the application decoder. As a result, the data stream containing syntax error can continue decoding or be decoded in better quality by a non-error-resilient application decoder, without adding any error correcting function in the existing application decoder.

6 Claims, 21 Drawing Sheets

IPv4 PACKET

PPP FRAME

RLP FRAME

FIG. 25

| not_coded (1bit, vop_coding _type==IN CASE OF "p") | mcbpc (1-9bit VARIABLE) | ac_pred_flag (1bit, mb_type== IN CASE OF intra or intra+q) |
|---|---|---|
| cpby (1-6bit, mb_type != IN CASE OF stuffing) | dquant (2bit, mb_type ==IN CASE OF intra+q or inter+q) | MOTION VECTOR (mb_type ==inter, inter+q or inter4v) |
| DIFFERENTIAL intra DC COEFFICIENT (mb_type==intra or intra+q AND use _intra_dc_vlc==IN CASE OF "1") | Intra AC COEFFICIENT or inter DC & AC COEFFICIENT (BLOCK DESIGNATED BY cbpy, cbpci) | | mcbpc : mb_type (intra, intra+q, inter, inter+q, inter4v, stuffing), cbpc
not_coded : IN CASE OF "1", mb_type=inter, NO MOTION, mcbpc
AND THEREAFTER OMITTED
use_intra_dc_vlc : DETERMINE BY quant AND intra_dc_vlc_thr,
AND TAKE THE VALUE OF "0" OR "1"

FIG. 26

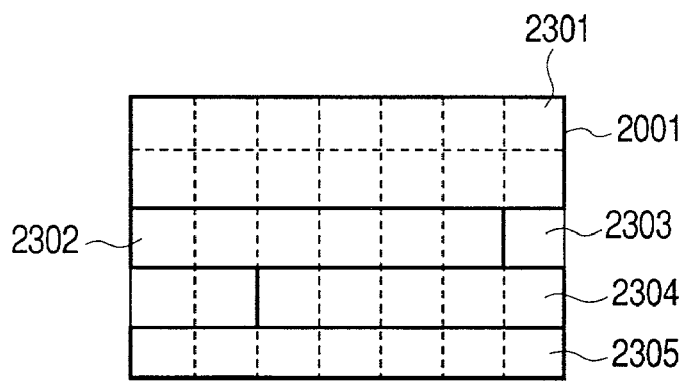

FIG. 27

VIDEO PACKET DATA (I-VOP)

| VIDEO PACKET HEADER | PRIORITY DATA PART (I-VOP) | dc_marker (19bit) | AC COEFFICIENT CONTROL INFORMATION (ac_pred_flag, cbpy) | AC COEFFICIENT INFORMATION |
|---|---|---|---|---|
| 2401 | 2402 | 2403 | 2404 | 2405 |

| resync_marker (17-23bit-unique word) | macroblock_number (1-14bit) | quant_scale (5bit) | header_extension_code (1bit) | |
|---|---|---|---|---|
| modulo_time_base (1bit AND ABOVE, TERMINATE WITH "0") | marker_bit (1bit) | vop_time_increment (1-16bit VARIABLE) | marker_bit (1bit) | vop_coding_type (2bit) |
| intra_dc_vlc_thr (3bit) | vop_fcode_forward (IN CASE OF 3bit, vop_coding_type !="1") | | vop_fcode_backward (IN CASE OF 3bit, vop_coding_type =="B") | |

PRIORITY DATA PART (I-VOP)

| mcbpc (1-9bit VARIABLE) | dquant (IN CASE OF 2bit, mb_type==intra+q) | DIFFERENTIAL intra DC COEFFICIENT (IN CASE OF use_intra_dc_vlc=="1") |
|---|---|---| mcbpc : mb_type (intra, intra+q stuffing), cbpc
use_intra_dc_vlc : DETERMINE BY quant AND intra_dc_vlc_thr, AND TAKE THE VALUE OF "0" OR "1"

AC COEFFICIENT
CONTROL INFORMATION

AC COEFFICIENT
INFORMATION

VIDEO PACKET DATA (P-VOP)

FIG. 33

PRIORITY DATA PART (P-VOP)   29021

| not_coded (1bit) | mcbpc (1-9bit VARIABLE) | MOTION VECTOR (mb_type==inter, inter+q, or inter4v) | mcbpc : mb_type (intra, intra+q, inter, inter+q, inter4v, stuffing), cbpc
IN CASE OF not_coded : "1", mb_type=inter, NO MOTION, mcbpc
AND THEREAFTER OMITTED

FIG. 34 intra DIFFERENTIAL DC COEFFICIENT
INFORMATION & AC COEFFICIENT
CONTROL INFORMATION   29041

| ac_pred_flag (IN CASE OF 1bit, mb_type==intra or intra+q) | cbpy (1-6bit) | dquant (IN CASE OF 2bit, mb_type==intra+q or inter+q) |
| --- | --- | --- |
| DIFFERENTIAL intra DC COEFFICIENT (mb_type==intra or intra+q) | | |

FIG. 35 intra AC COEFFICIENT or inter
DC & AC COEFFICIENT
INFORMATION

| intra AC COEFFICIENT or inter DC & AC COEFFICIENT (BLOCK DESIGNATED BY cbpy, cbpci) |  29051

APPARATUS FOR SYSTEM DECODER AND METHOD FOR ERROR CORRECTION OF PACKET DATA

BACKGROUND OF THE INVENTION

The present invention relates to video coding technique for mobile communication of digital media data, and in particular, to processing of received data when packet loss occurs.

As mobile communication service of the next generation, it is expected that digital media data file compressed and stored in delivery server will be received and decoded at wireless portable terminal such as portable telephone. As the service of communication when packet loss (loss of packet data in transmission) occurs in the wireless mobile communication service as described above, the following two modes are anticipated:
1) Streaming service: Unreliable transport protocol (e.g. UDP: User Datagram Protocol; RTP: Real-time Transport Protocol) is used without retransmitting loss packet (general term for unit of data or mass of data), and the data are received while receiving.
2) Download service: Reliable transport protocol to retransmit loss packet is used (e.g. TCP: Transmission Control Protocol; This is suitable for application requiring reliability because error detection and acknowledgment processing are performed to all of the messages. However, when the condition of transmission line is poor, reduction in the throughput may often occur due to frequent acknowledgment and retransmission request). All data are received and decoding processing is started after storing the data. (The details of UDP, RTP and TCP will be described later.)

Here, transport layer is a level to play a role "to deliver the data to the partner or to the other party in reliable manner" in a standard reference model of network architecture to achieve communication between different types of devices (OSI: Open Systems Interconnection; open type system interconnection; physical layer—data link layer—network layer—transport layer in the order from the position closer to communication line). IP (Internet Protocol) playing a role "to carry out address management or route selection" corresponds to the network layer. Of the above two types of services, in the download service, retransmission request is made to all packets with data loss, and transmission error is not contained in the received data. On the other hand, in the streaming service, even when there is a packet with data loss, it is not retransmitted, and the received data may contain transmission error.

Here, a concrete example is given. FIG. 2 is a diagram showing system arrangement of a portable telephone, and FIG. 3 shows packets to be transmitted. Let us assume a case where a packet string (a type of media data) of the transport layer shown in FIG. 3 is transmitted toward a portable telephone 200. Regardless of whether it is TCP or UDP-RTP, one packet of transport layer comprises header (411, 421, 431, 441, and 451) and payload (412, 422, 432, 442, and 452) of the transport layer. In this example, the payload is an actual media data. On the header, the following data are described: data amount (in byte) of the payload, serial number of the packet (sequence number), payload type (only in case of RTP; In case of TCP, data of two or more different types are not handled at one time. Identification of video data and audio data is performed on this data), and timestamp (only in case of RTP). First, a wireless signal received from an antenna 201 is electrically converted at a wireless interface unit 202, and it is inputted to a system decoder 205 in form of a packet 203 of data link protocol. At the system decoder 205, the inputted data link protocol packet is converted to a network packet and transport packet in this order. Only the transport payload is outputted to a memory 207. At the system decoder, error detection processing in the packet and identification of payload type in each packet (only in case of RTP) are carried out. Further, when media data of different payload types are delivered at the same time, the media data are arranged for each payload type, and these are outputted to the memory 207 while being synchronized with each other.

In case the transport protocol is TCP, the system decoder sends an acknowledgment information 204 to the wireless interface unit 202 for each packet arrived without error. Each of the acknowledgment information is converted to a wireless signal at the wireless interface unit 202 and is sent back to the transmission side. At the transmission side, after waiting for the acknowledgment of the transmitted packet, the next packet is transmitted (a plurality of packets may be processed in parallel). When the acknowledgment does not arrive after a certain time has elapsed from the transmission, the packet is retransmitted to the portable telephone 200. In this respect, no packet loss occurs in TCP, and the data comprising only the payloads as shown by 2060 in FIG. 4 are outputted to the memory 207 as the payload data 206. The payload data as mentioned here is generally the data of file format, which includes images, sounds, etc. in case of download. More concretely, these are MP4 file format of MPEG-4, QuickTime of Apple, WMT (Windows Media Technology) of Microsoft.

In case the transport protocol is UDP-RTP, the system decoder provides no acknowledgment, and the packet loss is allowed. For instance, in case a second packet (421 and 422) shown in FIG. 3 does not arrive at the system decoder, or in case transmission error is included in the second packet, the data comprising only the parts of payload except the second packet as shown by 2061 in FIG. 5 are outputted to the memory 207 as the payload data 206. The payload data as mentioned here are the data where packets of video coding data and packets of audio coding data are mixed together in case of streaming. Thus, a plurality of media data (e.g. video data and audio data) are delivered at the same time. When it is necessary to decode these data at the same time, the types of media decoders of each packet (e.g. video decoder, audio decoder) must be decoded according to the payload type contained in the header of RTP packet at the system decoder 205. Also, it is necessary to output the data to the memory 207 as media data of different types.

Then, the data stored at the memory 207 are sequentially outputted to an application decoder 209 as the media data 208 at the moment when the final packet of each decoding timing has arrived in case of streaming. In the present specification, the application decoder 209 is a general term for file decoder of file format and media decoder such as video decoder, audio decoder, etc. When it is defined as an application decoder, it is assumed there is no limitation to internal structure. In the application decoder, each of the media data is decoded at proper timing while error resilience of loss packet is performed. However, error resilience contained in the media decoder is not standardized. Thus, image quality or audio quality of the reconstructed image differs according to performance characteristics of error resilience when the packet loss is contained in the media data 208.

When packet loss occurs during transmission, the media data to be delivered to the application decoder is turned to such a form that payload of the packet with loss is omitted.

In general, at the application decoder, when a combination of the data string not complying with the applicable standard decoding scheme is detected in the inputted data, it is judged that a transmission error has occurred. For this reason, when the data string connecting the packets before and after the loss packet is complying with the applicable standard decoding scheme, accurate position of the transmission error cannot be detected.

Also, in order to decode the data with packet loss to an image with high quality, it is necessary that the application decoder detects the transmission error so that the influence of error may not be displayed on the image quality. Because the processing amount of the decoder is increased as the result of such error correction processing, the requirements in decoding speed or image size cannot be satisfied in an application where high-speed processor cannot be used from the reasons such as product price or power consumption.

SUMMARY OF THE INVENTION

In the portion of packet loss in the received data, a data string is inserted in the system decoder, and the application decoder can easily and explicitly judge from the data string that communication error has occurred. More concretely, a data string not contained in specification or standards of the application decoder is utilized as an insertion data. In so doing, the application decoder can detect accurate position of the transmission error. Also, by determining and arranging the data string to be inserted beforehand between the system decoder and the application decoder, more accurate position of the error can be detected. By utilizing the insertion data for error detection and by converting the media data containing error to a data complying with specification and standards of the application decoder, it is possible to reduce the burden of error correction processing at the application decoder.

Other and further objects, features and advantages of the invention will appear more fully from the following description.

BRIEF DESCRIPTION OF THE DRAWINGS

A preferred form of the present invention illustrated in the accompanying drawings in which:

FIG. 25 shows data arrangement of MB data in MPEG-4 video coding bit stream;

FIG. 26 shows an example of video packet in MPEG-4 video coding;

FIG. 27 represents data structure of video packet data (I-VOP) in MPEG-4 video coding bit stream;

FIG. 28 represents data structure of video packet header in MPEG-4 video coding bit stream;

FIG. 29 represents data structure of video packet priority data part (I-VOP) in MPEG-4 video coding bit stream;

FIG. 33 represents data structure of a video packet priority data part (P-VOP) in MPEG-4 video coding bit stream;

FIG. 34 represents data structure of a video packet differential Intra DC coefficient information & AC coefficient control information part in MPEG-4 video coding bit stream;

FIG. 35 represents data structure of a video packet intra AC coefficient or inter DC&AC control information part in MPEG-4 video coding bit stream;

DETAILED DESCRIPTION OF THE PREFERRED EMBODIMENT

Figure 2:
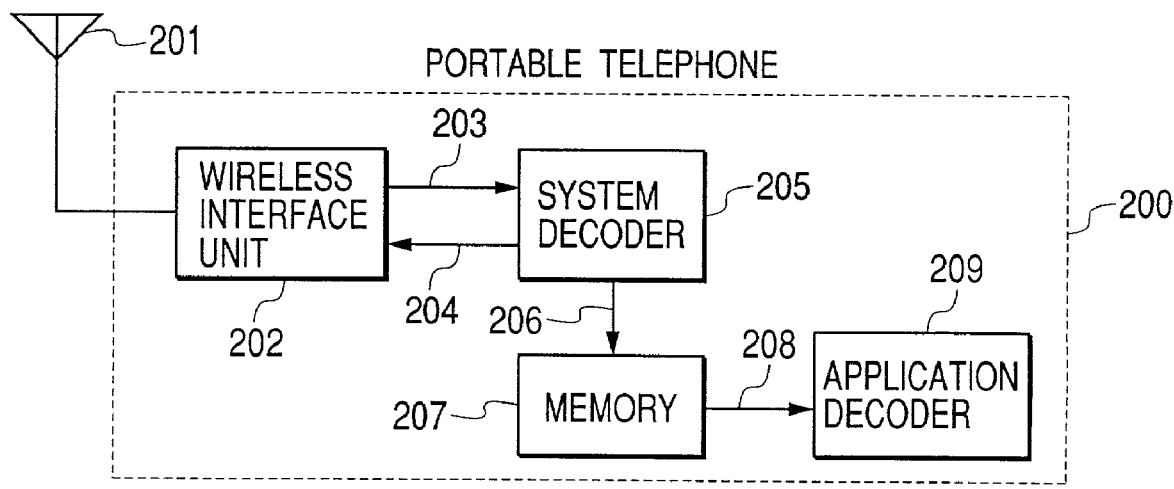
FIG. 2 is a diagram showing internal arrangement of a portable telephone.
Figure 3:
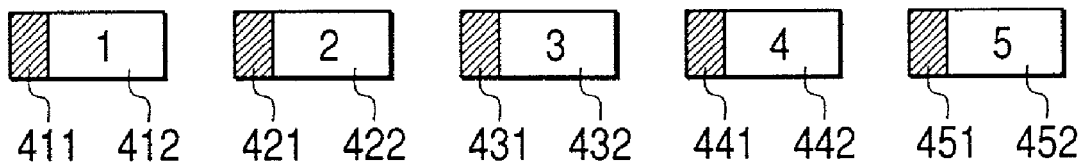
FIG. 3 shows an example of transmission packets.
Figure 4:
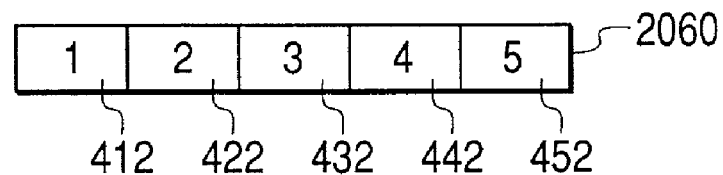
FIG. 4 shows an example of output media data from a system decoder in case no packet loss occurs.
Figure 6:
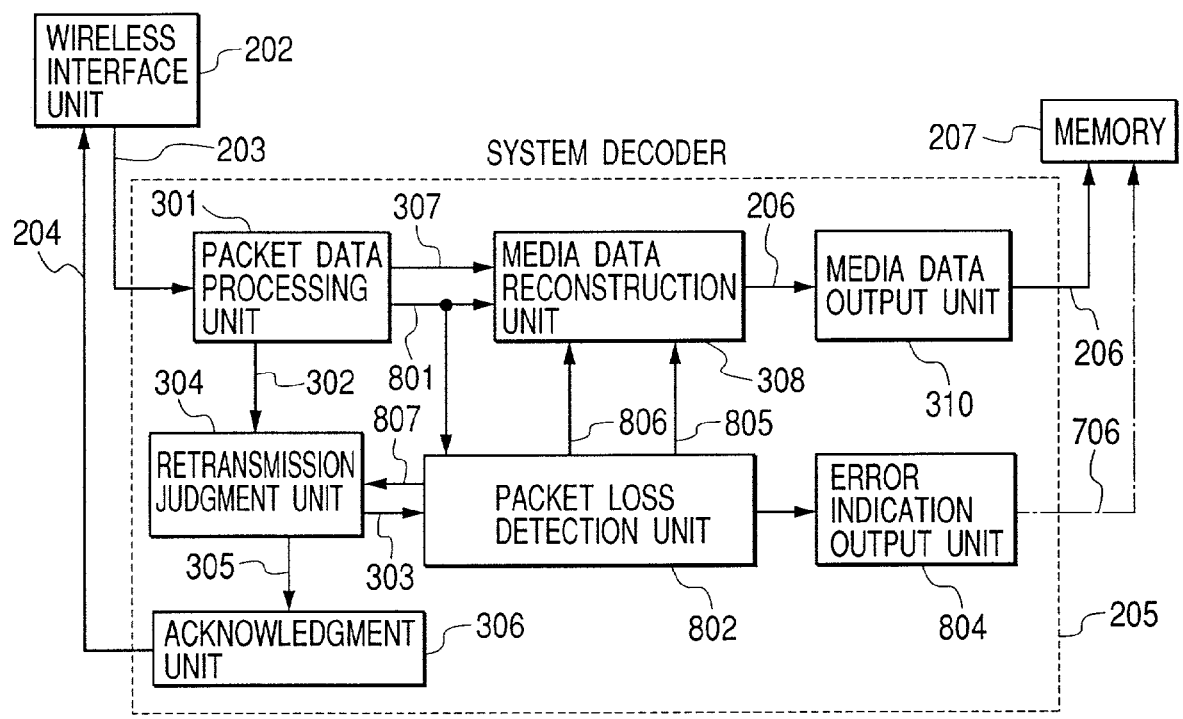
FIG. 6 is a block diagram of a system decoder to perform insertion processing of an insertion data for error detection.

First, referring to FIGS. 2, 38, 39, 6 and 7, description will be given on a design scheme to detect occurrence of packet loss. FIG. 6 is a diagram of internal arrangement of a system decoder 205 as shown in FIG. 2.

The inputted packet data is converted to a packet in transport layer by a packet data processing unit 301.

Figure 5:
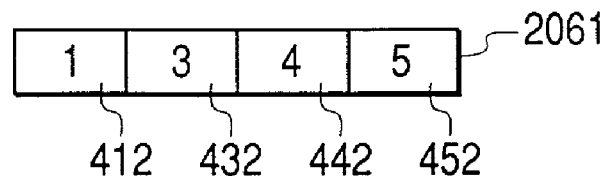
FIG. 5 shows an example of output media data from a system decoder when a packet loss occurs.
Figure 7A:
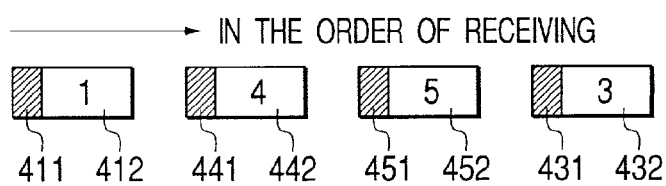
FIG. 7 shows output data to a media data reconstruction unit from a packet data processing unit in the system decoder of the present invention.
Figure 7B:
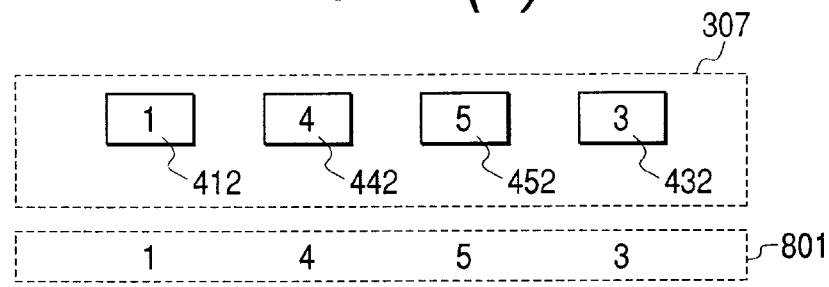

In case the protocol of the transport layer is UDP-RTP, error detection information contained in a header part of each UDP packet is analyzed. If the received packet contains an error, the packet is discarded at the packet data processing unit 301. RTP packet corresponds to a payload of UDP packet, and it comprises RTP header containing payload data, sequence number and payload type information. For this reason, even when a packet transmitted later has arrived earlier at the receiver, it can be rearranged in the order of transmission by the media data reconstruction unit 308 of the system decoder. In case the received UDP packet does not contain error, RTP packet is analyzed, and a payload data 307 and a time-stamp—sequence number—payload type 801 are outputted to the media data reconstruction unit 308. In this case, the time-stamp—sequence number—payload type 801 is also outputted to a packet loss detection unit 802. As a result, by analyzing the sequence number and the payload type at the packet loss detection unit 802, it is possible to detect the packet data not arrived yet and the packet data with a transmission error for each payload type. More concretely, even when it is the time to output data from the media data reconstruction unit 308, it is possible to judge from sequence number and payload type that the packet not arrived yet at the packet loss detection unit 802 is a loss packet. Upon receipt of the payload data 307 and the time-stamp—sequence number—payload type 801, the media data reconstruction unit 308 performs operation to rearrange the order of packet strings for each payload type according to sequence number and payload type of each RTP packet. For instance, as shown in FIG. 7(*a*), let us take an example of a case where a second packet (421 and 422) in a certain payload type is not yet arrived and packets of the payload type have arrived at the portable telephone in the order of a first packet, a fourth packet, a fifth packet, and a third packet because of the condition of a network used for communication. In this case, the packet data processing unit 301 processes the arrived packets in the order of arriving (i.e. 411 and 412, 441 and 442, 451 and 452, and 431 and 432). Then, these are outputted to the media data reconstruction unit 308 by dividing to a payload data string 307 comprising 412, 442, 452 and 432 and a time-stamp—sequence number—payload type string 801 (only sequence number is shown in the figure) as shown in FIG. 7(*b*). At the media data reconstruction unit 308, operation is performed to rearrange the order of packet strings for each payload type in accordance with the sequence number and the payload type of each RTP packet. In the example shown in FIG. 7, a payload data 2061 as shown in FIG. 5 is outputted to a memory 207 via a media data output unit 310, which plays a role of an interface between the system decoder and the application. The timing to output each payload data to the media data output unit 310 by the media data reconstruction unit 308 is controlled by a time-stamp contained in each RTP packet, while it is also possible to control by giving consideration on the decoding condition by the application decoder.

Figure 38:
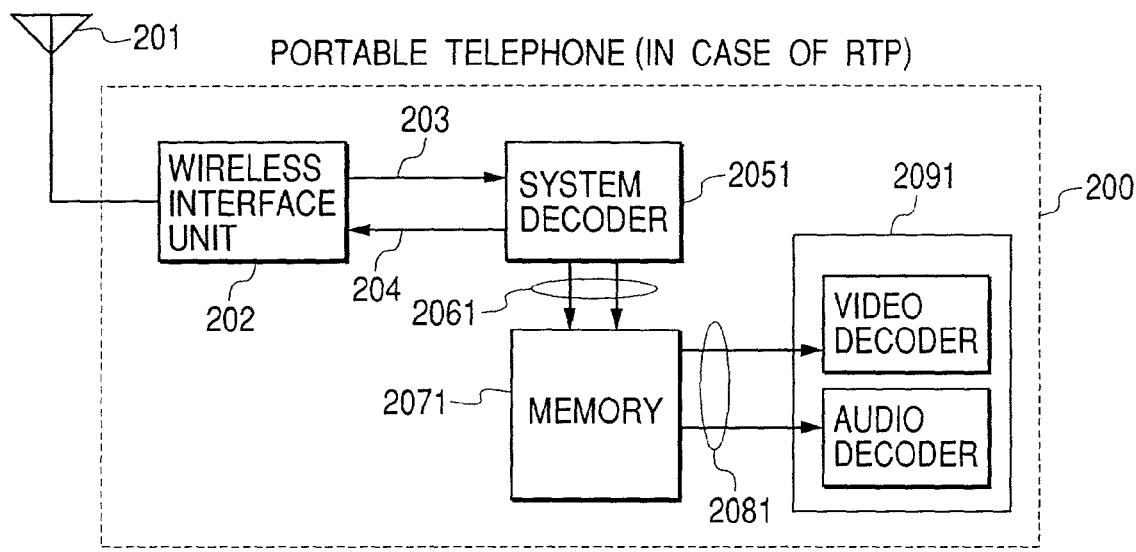
FIG. 38 is a diagram showing internal arrangement of a portable telephone when RTP is used.

FIG. 38 is a diagram of another embodiment of the portable telephone, and it shows a case where two types of media data (video data and audio data) are delivered by streaming delivery at RTP. The portable telephone shown in FIG. 38 differs from that of FIG. 2 in the stream of data from the system decoder to the application decoder.

In this case, the payload type of RTP packet header part shows video data or audio data. A system decoder 2051 checks payload type and sequence number described on the header part of each RTP packet received, and divides them to video data and audio data. Then, these are arranged in the order of the sequence number, and the payload data 2061 are outputted to a memory 2071 in the order of the rearranged sequence number. In this case, the timing to output each payload is determined in such manner that synchronization can be achieved between video and audio by taking the time-stamp of RTP packet header part as a reference. Each of media data 2081 stored in the memory 2071 is inputted to video decoder and audio decoder in the application decoder 2091 when it reaches enough data to start decoding process, and it is then decoded.

On the other hand, in case the protocol of the transport layer is TCP, error detection information contained in the header part of each TCP packet is analyzed, and an error detection result 302 is delivered to a retransmission judgment unit 304. In this case, if the received packet contains an error, the packet is cancelled. If the error detection result 302 delivers "no error" at the retransmission judgment unit 304, an acknowledgment information 305 is outputted to an acknowledgment unit 306. The acknowledgment information 305 is converted to a wireless signal 204 at the acknowledgment unit 306 and is delivered to the transmission side via a wireless interface unit 202. At the transmission side, if the acknowledgment for a packet is not received after a certain time has elapsed from transmission, the packet is retransmitted to the portable telephone 200. In case the protocol is TCP, packet transmission at the transmission side is performed by taking arriving status of the acknowledgment into account, and illegal packet does not basically occur. However, in recent years, quasi-streaming is also proposed as a service, which has high performance characteristics somewhere between the reliability of the download service and real-time features of the streaming service. In the quasi-streaming, "reliable transport protocol with as high reliability as the download service is used. The media data is transmitted by dividing into several files, and these are decoded from the media data in the files received without waiting for the receiving of all data necessary for decoding". The download service has high reliability in communication, but decoding process cannot be started until the files are completely received. For this reason, in case of a terminal equipment, which cannot incorporate large memory such as portable telephone, media data requiring long decoding time cannot be received. In this respect, it is more effective to divide the media data beforehand and to decode from the arrived files. Then, the processed files are deleted from the memory. However, when quasi-streaming is performed in mobile communication, if retransmission of the packet frequently occurs, even when decoding of a file has been completed, the next file does not arrive, and decoding process must be temporarily stopped. For this reason, in quasi-streaming, even in case of communication with reliable connection with the transmission side such as TCP, it is necessary to incorporate a system to allow the packet error to some extent. This method to allow the packet error is effective even in the download service if the situation such as delay from user command is taken into account.

The method for detecting packet loss when packet loss is allowed in TCP is by itself a method to allow packet loss. To allow the packet loss, the acknowledgment procedure should be controlled either on the transmission side or on the terminal side. To control the acknowledgment procedure on the transmission side, the task is accomplished by giving up the arrival of acknowledgment when the acknowledgment does not arrive after a given time has elapsed or when number of retransmissions exceeds a given number. In this case, the occurrence of the packet loss can be confirmed by sequence number string in TCP packet header part. (In TCP, since number of packets for acknowledgment performed at the same time is delivered to the terminal side, the occurrence of packet loss can be detected when the packet having a sequence number higher than that condition has been received.) However, by this method, it is not possible to reflect the progress of decoding process in the application decoder on the terminal side to the control of the acknowledgment procedure. As a result, if there is a deviation between the estimated value and the real value of the processing time in each file, decoding process may also have to be temporarily stopped.

In this connection, description will be given below on a method to control the acknowledgment process on the terminal side. More concretely, the retransmission judgment unit 304 and the packet loss detection unit 802 shown in FIG. 6 are utilized. The packet data processing unit 301 analyzes error detection information contained in the header part of each TCP packet and delivers an error detection result 302 to the retransmission judgment unit 304. In this case, if the received packet contains an error, the packet is cancelled. On the other hand, in case the received packet does not contain an error, TCP packet is analyzed, and the payload data 307 and the sequence number 801 (there is no payload type in TCP) are outputted to the media data reconstruction unit 308. At the same time, the sequence number 801 is outputted to the packet loss detection unit 802. In so doing, by analyzing the sequence number at the packet loss detection unit 802, it is possible to detect the packet which is not received yet. More concretely, if sequence number of a packet has not arrived from the packet data processing unit 301, it is judged that it is a packet not yet received. At the packet loss detection unit 802, if a packet is not received yet after a predetermined time (controlled by the system decoder) has elapsed although the packets before and after it have been received, it is regarded as a loss packet, and its sequence number 807 is delivered to the retransmission judgment unit 304. At the retransmission judgment unit 304, by retransmission of the loss packet, it is judged whether there is any trouble in the decoding process. In case it is judged that there is a problem in the delay of decoding process when retransmission is being waited, the acknowledgment information 305 is delivered to the acknowledgment unit 306, and a retransmission judgment result—sequence number 303 indicating that retransmission is not performed is sent to the packet loss detection unit 802. In case it is judged that decoding process can be performed without any trouble even when retransmission is being waited, the retransmission judgment result—sequence number 303 indicating that retransmission is to be carried out is sent to the packet loss detection unit 802. From the result of this reply, it can be judged whether the packet not yet received at the media data reconstruction unit 308 is a packet waiting for retransmission (retransmission judgment result is sent to indicate that retransmission is to be carried out) or it is a packet allowed as packet loss (retransmission judgment result is sent to indicate that retransmission is not to be carried out). For the packet waiting for retransmission, if it is not received yet even after a predetermined time (controlled by the system decoder) has elapsed, the sequence number 807 is delivered again to the retransmission judgment unit 304. At the retransmission judgment unit 304, judgment is made on the possibility of retransmission request by taking the number of retransmissions into account. For the packet received after it has been judged as loss packet by the retransmission judgment unit 304, it is possible to rewrite the information by performing process as usual. The media data reconstruction unit 308, which received the payload data 307 and the sequence number based on the procedure as described above, upon receipt of the payload data 307 and the sequence number, can perform operation to rearrange the order of output of the received packets according to the sequence number of each TCP packet. After the rearrangement, the timing to output the payload data to the media data output unit 310 by the media data reconstruction unit 308 is generally controlled at a given time interval, while it is also possible to control by taking decoding status of the application decoder into account.

Figure 39:
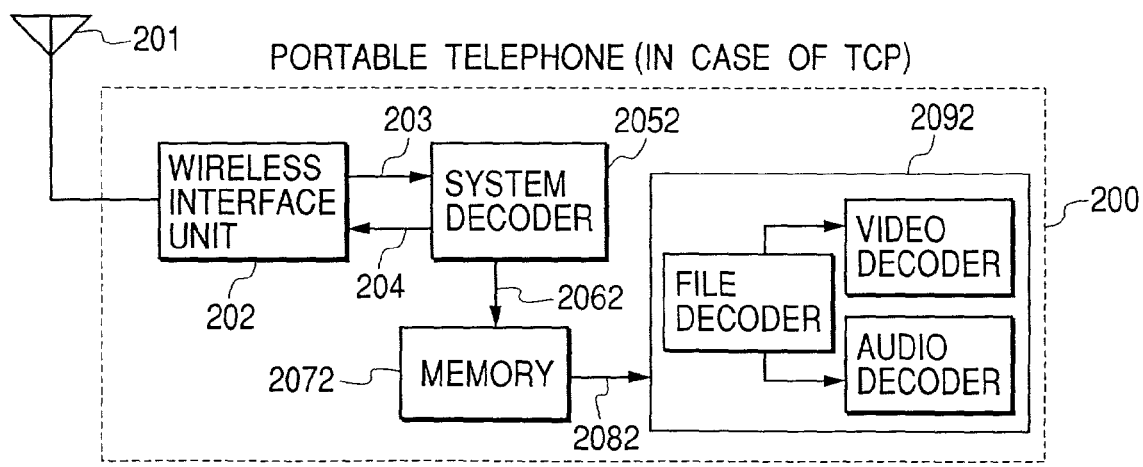
FIG. 39 is a diagram showing internal arrangement of a portable telephone when TCP is used.

FIG. 39 is a diagram showing another example of a portable telephone. This indicates a case where MP4 file format data with two types of media data (video data and audio data) unified and stored in a single file is delivered by quasi-streaming at TCP. In FIG. 39, data stream from the system decoder to the application decoder is different from that of the portable telephone 200 shown in FIG. 2.

The system decoder 2052 checks the sequence number of TCP packet header part, and a payload data 2062 is outputted to a memory 2072. In this case, output timing of each payload is determined by giving consideration on processing status of the media data in the application decoder. Processing status at the application decoder is also reflected to retransmission control of the loss packet in the system decoder. The media data 2082 stored in the memory 2072 is inputted to a file decoder in the application decoder 2092 at the moment when it is established as a file format data. At the file decoder, each media data in the file is picked up from the information in the file header (it is assumed here that video data and audio data are contained), and these are inputted to video decoder and audio decoder respectively.

Figure 40:
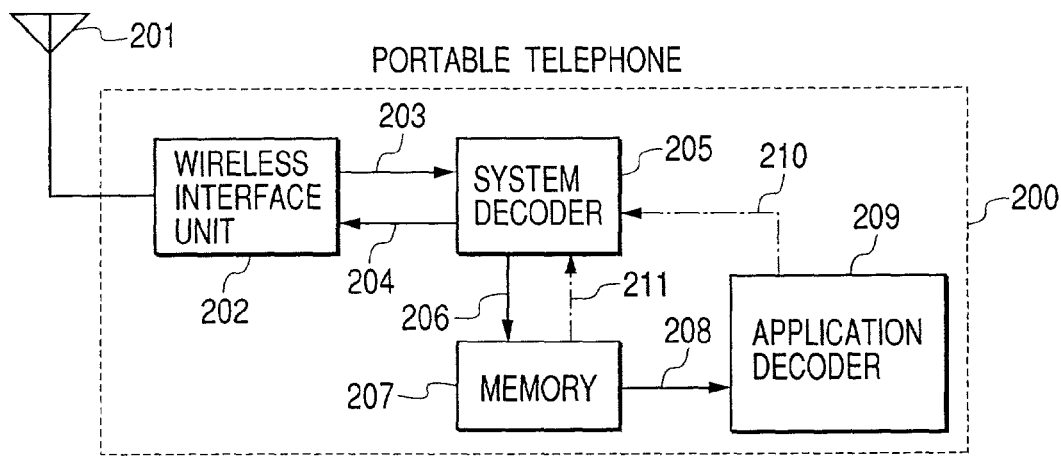
FIG. 40 is a diagram showing internal arrangement of a portable telephone, by which it is possible to perform retransmission judgment of illegal packet by giving consideration on processing condition of application decoder.
Figure 41:
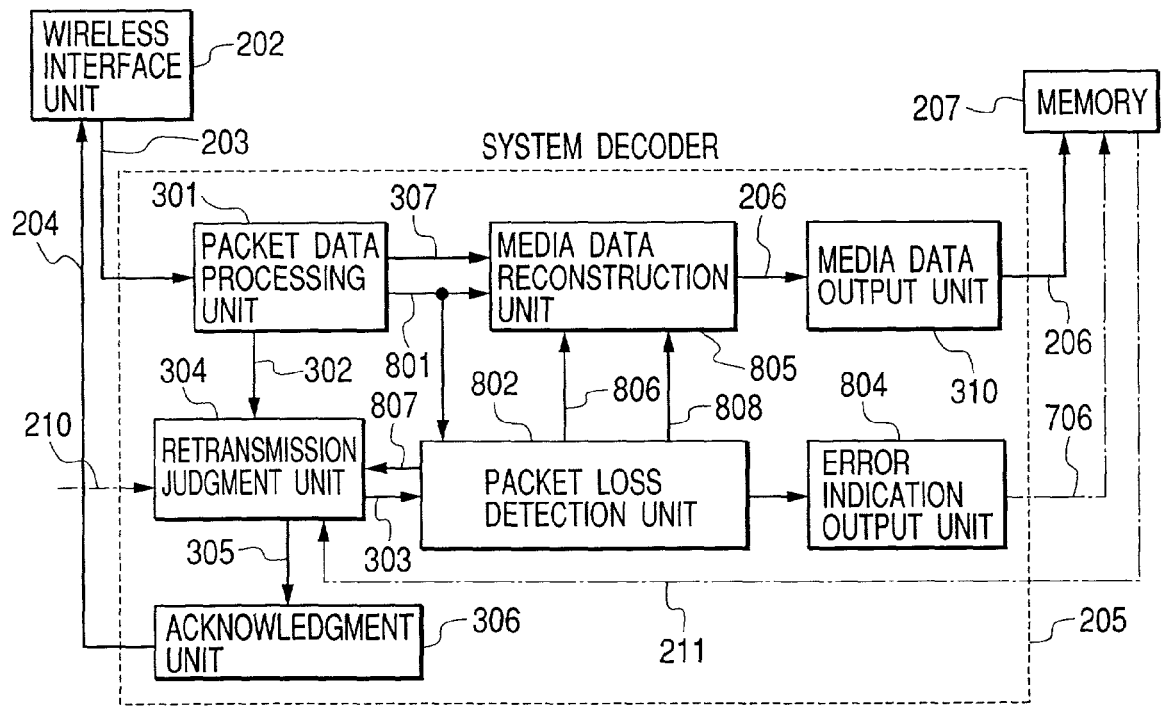
FIG. 41 is a diagram of a system decoder for insertion processing of insertion data for error detection.

FIG. 40 shows still another example of the portable telephone, and FIG. 41 shows another example of the system decoder. By taking processing status at the application decoder into account, description will be given on data stream to perform judgment on retransmission request of loss packet and error packet at the retransmission judgment unit 304. The data 210 and 211 shown in FIG. 40 correspond to the information related to processing status. The data 211 include the data such as the number of data not processed yet in the memory. The data 210 include the data such as status of occurrence of decoding delay, frame rate and bit rate, etc. These data are sent to the retransmission judgment unit 304 shown in FIG. 41. At the retransmission judgment unit 304, the influence of the waiting for packet retransmission on the application decoder is estimated from the following data: the number of remaining data obtained by the data 211, information relating to the consuming speed of the data obtained from the data 210, estimated time required for the arriving of retransmission packet (to be estimated from data arriving status up to that moment), and the importance of the packet (e.g. when the header part of the file format data or the sequence header part of video data are lost, difficulty may arise in reconstruction of the entire data).

As the method to control the packet loss in TCP, it is also possible to control both on the transmission side and on the receiving side. In this case, in addition to the acknowledgment information, by sending retransmission cancellation request or retransmission request from the terminal side to the transmission side, it possible to control at high speed and in more elaborate manner.

In the quasi-streaming utilizing TCP as described above, there is a problem that only one type of media data can be handled in one communication. For this reason, file header must be provided for each file generated by dividing media data, and this may require the increase of communication capacity. In this respect, communication means of TCP-RTP is also effective in quasi-streaming. Here, description will be given on the structure of TCP-RTP in the method to control acknowledge processing on the terminal side referring to FIG. 6. The packet data processing unit 301 analyzes error detection information contained in the header part of each TCP packet and delivers an error detection result 302 to a retransmission judgment unit 304. In this case, if the received packet contains an error, the packet is cancelled. On the other hand, if the received packet does not contain error, TCP packet header and RTP header contained in TCP payload are analyzed, and RTP payload data 307 and a TCP sequence number—RTP time-stamp—RTP sequence number—RTP payload type 801 are outputted to the media data reconstruction unit 308. At the same time, TCP sequence number—RTP time-stamp—RTP sequence number—RTP payload type 801 is outputted to the packet loss detection unit 802. In so doing, at the packet loss detection unit 802, TCP sequence number, RTP payload type, and RTP sequence number are analyzed, and RTP packet not received and its payload type can be detected. More concretely, a packet with its TCP sequence number not yet received from the packet data processing unit 301 is judged as the packet not received yet, and its type is judged from RTP payload type and RTP sequence number. At the packet loss detection unit 802, if a TCP packet is not received yet when a predetermined time (controlled by the system decoder) has elapsed although TCP packets before and after it have been received it is judged as a loss packet, and its TCP sequence number 807 is delivered to the retransmission judgment unit 304. At the retransmission judgment unit 304, it is judged whether there is trouble or not in decoding process by retransmission of the loss packet. In case it is judged that there is a problem in delay of decoding process when retransmission is being waited, the acknowledgment information 305 is delivered to the acknowledgment unit 306. Then, a retransmission judgment result—TCP sequence number 303 indicating that retransmissions is not to be performed is sent to the packet loss detection unit 802. In case it is judged that decoding process can be carried out without any trouble even when retransmission is being waited, a retransmission judgment result—TCP sequence number 303 indicating that retransmission is to be performed is sent to the packet loss detection unit 802. From the result of this reply, the packet loss detection unit 802 can judge whether TCP packet not received by the media data reconstruction unit 308 is a packet waiting for retransmission (retransmission judgment result is sent to indicate that retransmission is to be carried out) or it is a packet allowed as packet loss (retransmission judgment result is sent to indicate that retransmission is not to be carried out). For the packet waiting for retransmission, if it is not received even after the elapse of a predetermined time (controlled by the system decoder), TCP sequence number 807 is delivered again to the retransmission judgment unit 304. At the retransmission judgment unit 304, judgment is made on the possibility of retransmission request by taking the number of retransmissions into account. For the packet received after it has been judged as a loss packet by the retransmission judgment unit 304, it is also possible to rewrite the information by the processing as usual. At the media data reconstruction unit 308, which receives the payload data 307 and the TCP sequence number RTP—time-stamp—RTP sequence number—RTP payload type, operation is performed to rearrange the order of packet strings for each payload type according to the sequence number and the payload type of each RTP packet. For the timing to output each payload data to the media data output unit 310 by the media data reconstruction unit 308, it is effective to adopt the method to control by giving consideration on the time-stamp contained in each RTP packet and decoding status of application decoder. The method to decode each payload outputted from the system decoder can be described, for instance, referring to FIG. 38. In case two types of media data (video data and audio data) are delivered by quasi-streaming at TCP-RTP, the payload type of RTP packet header part indicates video data or audio data. The system decoder 2051 checks payload type and sequence number described at the header part of each RTP packet received, divides them to video data and audio data, and outputs the payload data 2061 in the order of the sequence number to the memory 2071. In this case, the timing to output each payload is determined by giving consideration on the time-stamp of the RTP packet header part and on processing status of the media data in the application decoder. Also, retransmission control of loss packet at the system decoder reflects processing status at the application decoder. Retransmission control of the loss packet at the system decoder can be explained referring to FIG. 40 and FIG. 41 similarly to the case of TCP. Data 210 and 211 shown in FIG. 40 correspond to the information relating to the processing status. The data 211 include the number of data not processed yet in each payload type in the memory. The data 210 include the data such as status of occurrence of decoding delay, frame rate and bit rate. These data are sent to the retransmission judgment unit 304 shown in FIG. 41. At the retransmission judgment unit 304, estimation is made on the number of remaining data obtained by the data 211, information relating to the consuming speed of the data obtained from the data 210, estimated time required for the arriving of retransmission packet (estimated from the arriving status up to that moment), the importance of payload type (interruption of audio decoding process is basically not permitted), ratio of payload type of the loss packet, time-stamp of each payload type, etc., and influence of the waiting for packet retransmission on the application decoder. Each of the media data 208 stored in the memory 207 is inputted to the video decoder and the audio decoder in the application decoder 209 one after another at the moment when the predetermined data amount is reached by giving consideration on "the waiting time from receiving to the starting of decoding by taking transmission speed of TCP communication in quasi-streaming into account", and decoding process is performed.

Figure 8:
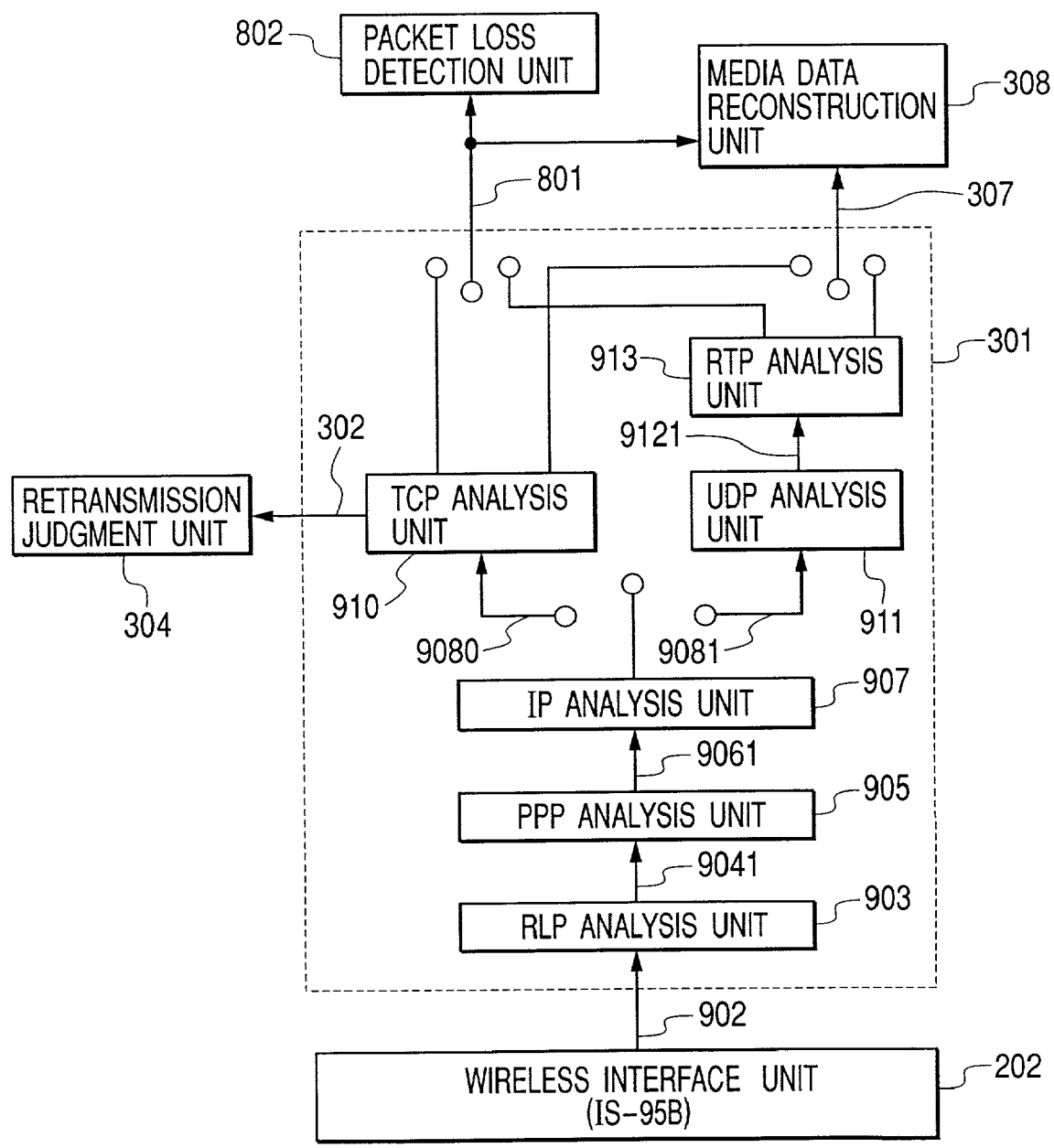
FIG. 8 shows an example of a procedure of a packet data processing unit in the system decoder of the present invention.
Figure 9:
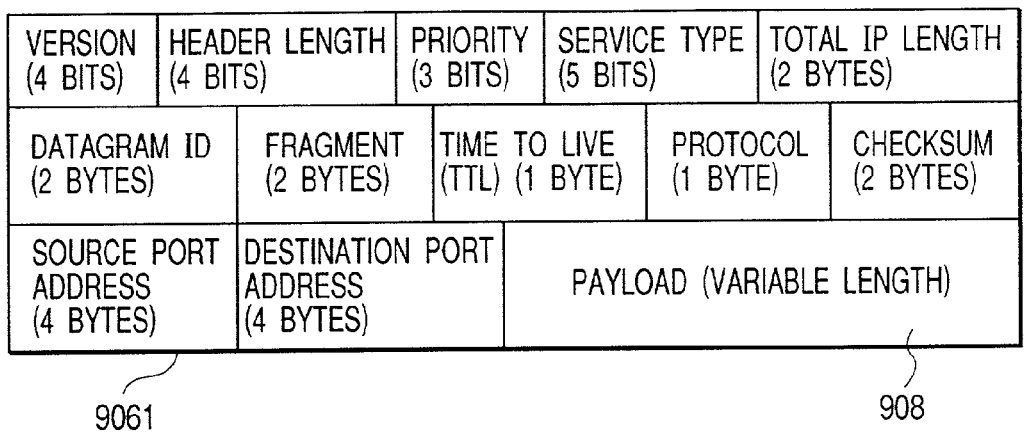
FIG. 9 shows data arrangement of an IPv4 packet.
Figure 10:
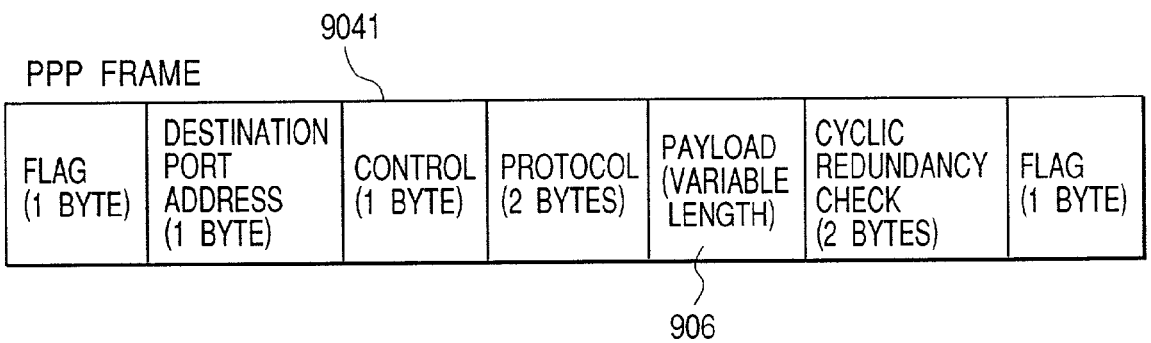
FIG. 10 shows data arrangement of a PPP frame.
Figure 11:
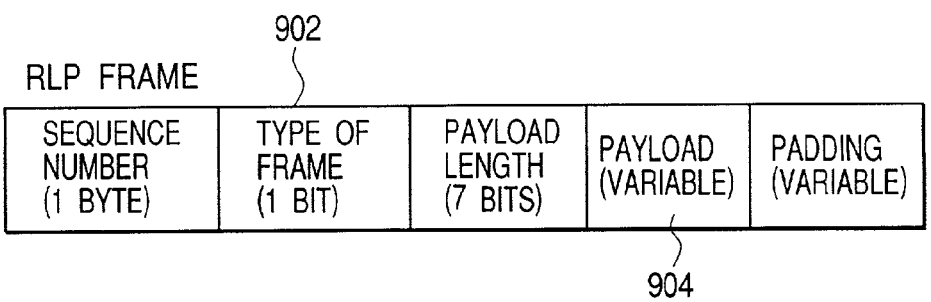
FIG. 11 shows data arrangement of a RLP frame.
Figure 12:
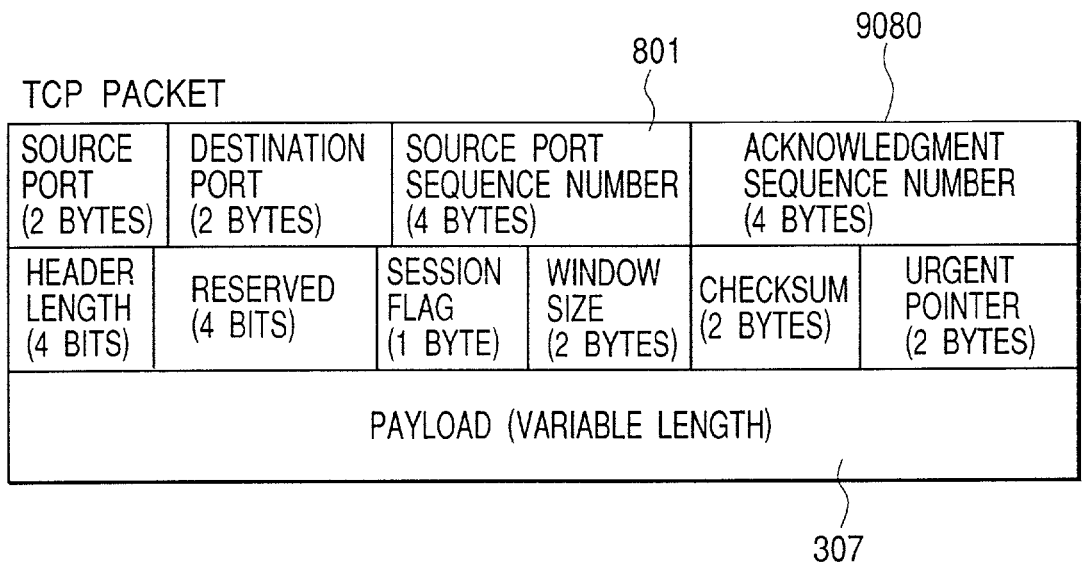
FIG. 12 shows data arrangement of a TCP packet.
Figure 13:
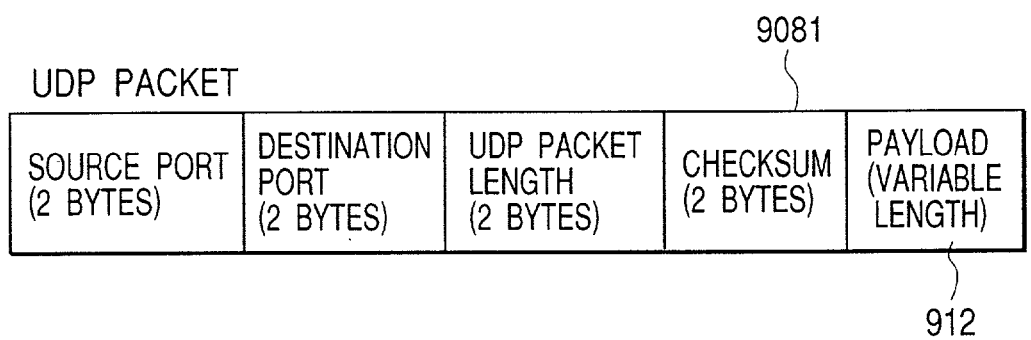
FIG. 13 shows data arrangement of a UDP packet.
Figure 14:
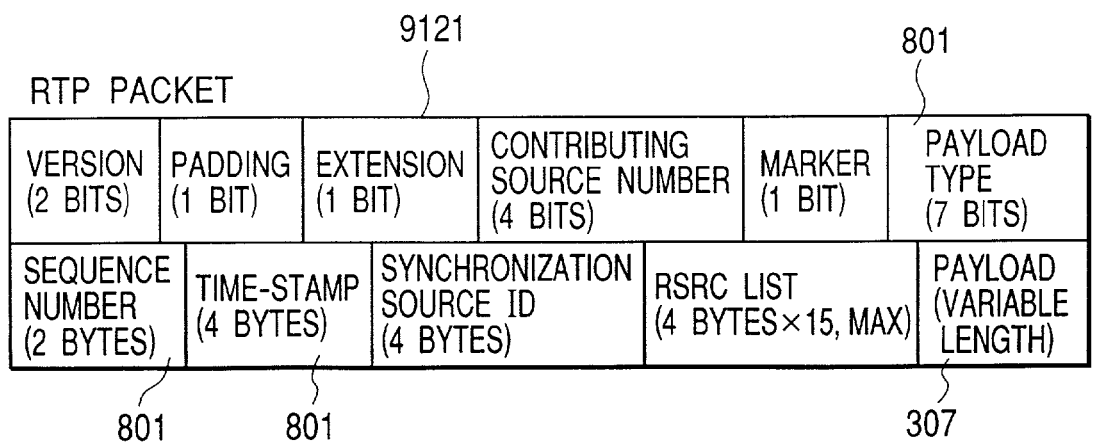
FIG. 14 shows data arrangement of a RTP packet.

Here, brief description will be given on operation of the packet data processing unit 301. FIG. 8 is a diagram showing details of a packet data processing unit of IS-95 standard wireless terminal. First, a wireless signal is converted to a frame data 902 (both frame and packet indicate unit of data)

of RLP (Radio Link Protocol), i.e. data link control protocol, at a wireless interface unit 202, and it is inputted to RLP analysis unit. FIG. 11 shows a data format of RLP frame. RLP is a communication protocol corresponding to CDMA data, and it plays a role to maintain interface with data link protocol. At the RLP analysis unit 903, a frame data 9041 corresponding to PPP (Point to Point Protocol) is constructed by combining a plurality of RLP payload data 904 according to RLP header information, and this is outputted to a PPP analysis unit 905. FIG. 10 shows a data format of a PPP frame. PPP is a type of data link protocol, and it is used on a serial line. The data link layer plays a role "to establish physical communication" and a role to "detect error generated while the data is sent through communication line". At the PPP analysis unit 905, discrimination of network protocol used (to analyze high-order protocol data), detection of error generated while data is sent through communication line (to analyze error check [cyclic redundancy check]), and processing to construct IP packet data 9061 combining a plurality of payload data 906. Here, it is assumed that IPv4 is adopted as a protocol of network, which is a high-order protocol. (As IP generally known, there are, in addition, IPv6, AppleTalk, etc., and these can be also applied in the present invention.) FIG. 9 shows a data format of IPv4 packet. An IPv4 packet data 906 is inputted to an IP analysis unit 907. At the IP analysis unit, discrimination of the transport protocol used (to analyze high-order protocol data) and detection of error at the header part (to analyze checksum data) are performed. Also, by combining a plurality of IP payload data 908, the packet of high-order protocol is constructed. In case the high-order protocol is TCP, a TCP packet 9080 is outputted to a TCP analysis unit 910. If it is UDP, a UDP packet 9081 is outputted to a UDP analysis unit 911. FIG. 12 shows a data format of TCP packet, and FIG. 13 represents a data format of UDP packet. TCP and UDP are used for different purposes according to the property of transmission data. In general, for the data with more importance on reliability than transmission speed, TCP is used. In case the real-time features are more important, UDP is used. At the TCP analysis unit 910, error detection process is carried out by analyzing checksum contained in the header part of the TCP packet, and an error detection result 302 is delivered to the retransmission judgment unit 304 (the same as the error detection result 302 and the retransmission judgment unit 304 shown in FIG. 6). When the error detection result delivers "no error", the payload data 307 is delivered to the media data reconstruction unit 308, and a source port sequence number 801 is delivered to the packet detection unit 802 and the media data reconstruction unit 308. On the other hand, at the UDP analysis unit, UDP payload data is outputted to RTP analysis unit 913 as RTP packet data 9121. Checksum of UDP packet is optional, and error detection is also not a mandatory operation, while these are recommended to use for the purpose of providing stable communication. At the RTP analysis unit 913, the payload 307 is sent to the media data reconstruction unit 308, and the time-stamp—sequence number—payload type 801 is sent to the packet detection unit 802 and the media data reconstruction unit 308.

Figure 42:
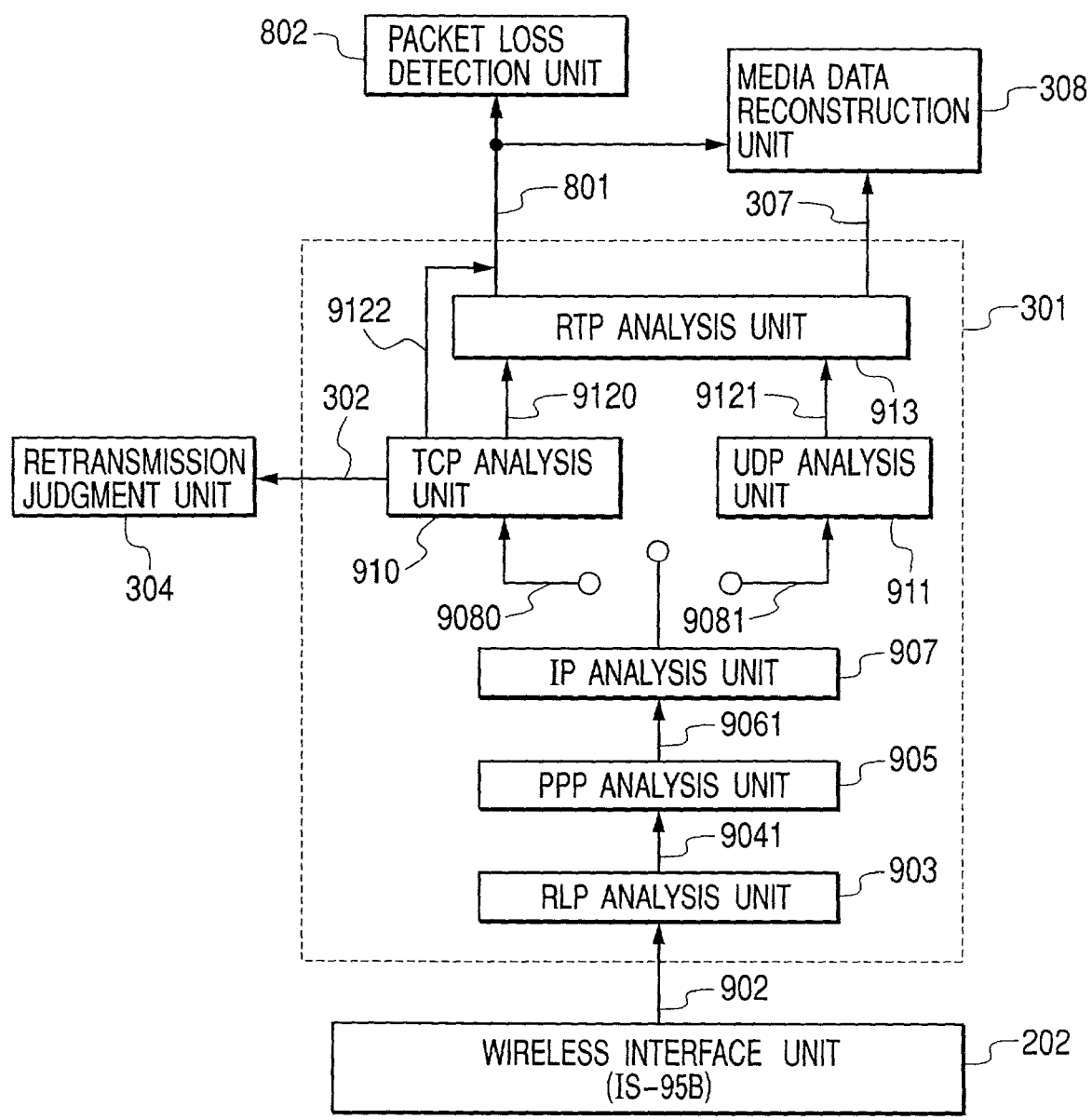
FIG. 42 shows an example of a procedure of a packet data processing unit in quasi-streaming in the system decoder of the present invention.

FIG. 42 is a diagram where the process of TCP unit in FIG. 8 is replaced by TCP-RTP. The difference from FIG. 8 lies in the portion of TCP-RTP. At the TCP analysis unit, error detection process is performed by analyzing checksum contained in the header part of the TCP packet, and the error detection result 302 is delivered to the retransmission judgment unit 304 (the same as the error detection result 302 and the retransmission judgment unit 304 as shown in FIG. 6). In case the error detection result delivers "no error", TCP payload data is delivered to RTP analysis unit as an RTP payload data 9120, and TCP sequence number 9122 of TCP header part is delivered to the packet loss unit and the media data reconstruction unit. At RTP analysis unit 913, RTP payload 307 is distributed to the media data reconstruction unit 308, and time-stamp, sequence number, and payload type of the RTP header are distributed to the packet detection unit 802 and the media data reconstruction unit 308 together with the TCP sequence number.

Next, description will be given on a method to explicitly indicate packet loss position to the application decoder using packet loss information obtained at the packet loss detection unit 802 in FIG. 6. As shown in FIG. 5, in case packet loss occurs, the data of the loss packet section is omitted and it is delivered to the application decoder. The information on the packet loss is not sent to the application decoder. For this reason, whether or not the application decoder can perform decoding process by taking occurrence of packet loss and the position of error into account depends on the error detection ability of the application decoder. For instance, in case a data string generated by connecting the packets before and after the loss packet together is complying with the specification of the application decoder, this may be the cause of the delay in the detection of packet loss. In the present invention, in order that the application decoder can accurately identify the position of occurrence of the packet loss, a coding string not understandable by the application decoder is inserted into the packet loss section. More concretely, in order to facilitate error detection at the application decoder, a data string not understandable by the decoder (insertion data for error detection) is inserted into the packet loss section. Because the application decoder judges an undecodable data string as an error, it is possible to accurately detect the position of the occurrence of the packet loss. As a result, the delay of error detection, in which an error data may be handled as a complying data with the decoder specification by the decoder, can be avoided, and disturbance of the reconstructed image and audio can be prevented. The application decoder as mentioned here includes media decoder such as file decoder of file format, video decoder, audio decoder, scene description decoder (processing to reconstruct display position of a plurality of objects), etc. Therefore, the data string not understandable by the application decoder (insertion data for error detection) varies according to the type of the decoder contained in the application decoder. For instance, in case the application decoder comprises file decoder of MP4 file and media decoder of video-audio as shown in FIG. 39, the data strings not understandable by all of the file decoder, the video decoder, and the audio decoder may be regarded as "coding strings not understandable by the application decoder (insertion data for error detection)". Or, a coding string not understandable as a whole by the application decoder (insertion data for error detection) may be defined as not understandable by inserting: a coding string not understandable only by the file decoder in case the loss packet corresponds to the header part of MP4 file, a coding string not understandable only by video decoder in case it corresponds to video data part, and the coding string not understandable only by the audio decoder in case it corresponds to audio data part. Also, as shown in FIG. 38, in case the application decoder comprises audio decoder and video decoder, the received packet is processed by dividing to video data and audio data. In this respect, different insertion data for error detection should be prepared for each payload type, and coding string not understandable (insertion data for error detection) as a whole by the application decoder can be defined.

The procedure to insert data strings for error detection is as follows: As already described, sequence number (and payload type) and retransmission processing status (in retransmission processing/packet loss) of the packet not yet arrived at the media data reconstruction unit 308 are recognized at the packet loss detection unit 802. As shown in FIG. 6 and FIG. 41, the insertion data for error detection 805 is generated at the packet loss detection unit 802, and a structure to deliver its insertion data and the sequence number (and payload type) 806 of loss packet to the media decoder reconstruction unit 308 is provided in the system decoder. Then, the media decoder reconstruction unit 308 outputs the insertion data for error detection 805 in the order corresponding to the sequence number (and payload type) 806 of the loss packet. In so doing, the data for error detection can be inserted. Here, for the purpose of simplification, description is given on the type of insertion data by taking an example in the case where the application decoder to decode media data of a section with packet loss is MPEG-4 video standard, i.e. payload type of the RTP packet is video the case as shown in FIG. 39.

Figure 15:
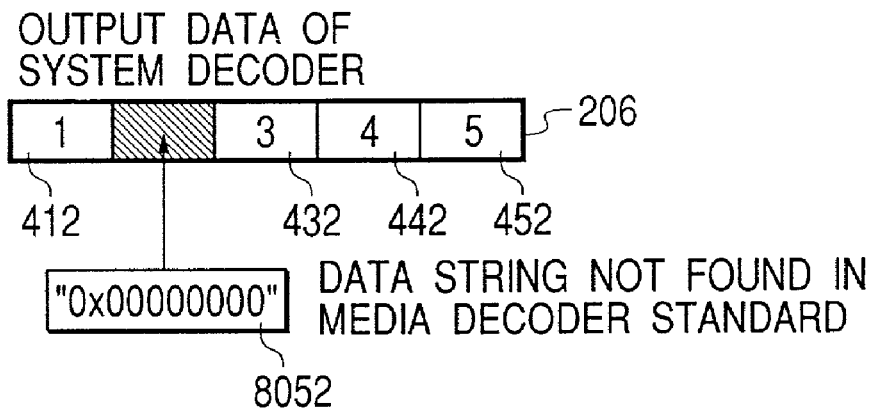
FIG. 15 represents an example of an insertion data for error detection according to the present invention.

FIG. 15 shows an example of the insertion data for error detection in case a second packet is lost as shown in FIG. 5. According to the MPEG-4 video standard, it is prohibited to continue 24 or more "0"s in binary. Therefore, the insertion data 8052 is a data string not complying with the MPEG-4 video standard. This cannot be understood by the video decoder, and it is recognized that an error has occurred. However, in case a unique word not specially predetermined with the application decoder (video decoder in this case) is used as the insertion data for error correction, error can be detected near the packet loss position, but it is difficult to accurately detect the packet loss position between the error data and the complying data with specification of decoder. Accordingly, this is strait-forward solution as a method to detect packet loss position, when the system decoder is newly developed by using a currently available video decoder, but it is not possible to obtain satisfactory performance for detection.

Figure 1:
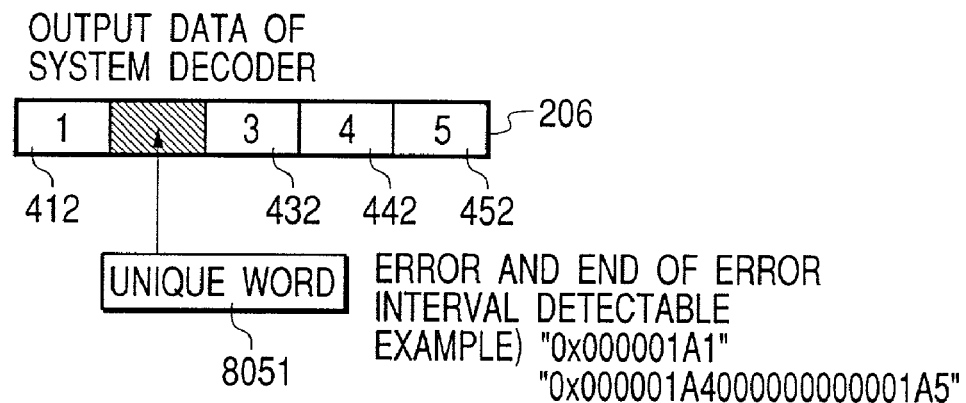
FIG. 1 shows output data of a system decoder with unique word inserted in it according to the present invention.

In this respect, an example of the MPEG-4 video standard is shown in FIG. 1 for the case where a unique word 8051 arranged beforehand with the application decoder is inserted. In the MPEG-4 video standard, a combination of 23 "0"s and one "1" is used as an identification code to indicate a starting point of a data interval. It is designed in such manner that 2-byte data following the 24 bits shows the type of the identification. A1 and A5 of hexadecimal used in FIG. 1 are identification codes for reserve, and these are not used in the current standard. Therefore, this unique word cannot be understood by the standard decoder of the MPEG-4 video, and this is regarded as an error. If it is designed in such manner that the MPEG-4 video decoder and the packet loss detection unit 802 can understand beforehand that such data string is the insertion data for error detection, accurate packet loss position can be detected by the video decoder, and the changing point between complying data with specification of decoder and insertion data for error detection can be clearly found. Also, it is effective to use a method to predetermine two unique words and to attach these unique words at the beginning and the end of the insertion data for error detection respectively. According to this method, even when several bits of the first unique word are erroneously decoded, it is possible by retrieving the second unique word to accurately detect the position where the complying data with specification begins, since the error can be detected in the middle of the insertion data section (with 24 or more "0"s between them) In case the data processed once can be retrieved again, the first unique word should be retrieved again by turning back a little, and the position where packet loss begins can also be accurately detected.

Figure 16:
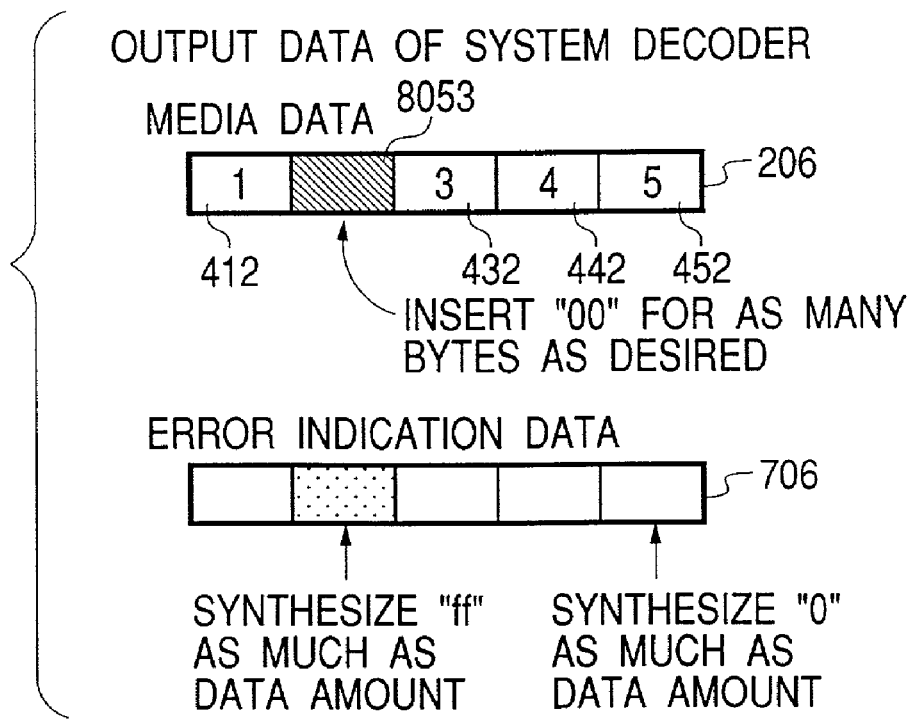
FIG. 16 represents an example of an insertion data for error detection to add error indication data according to the present invention.
Figure 17:
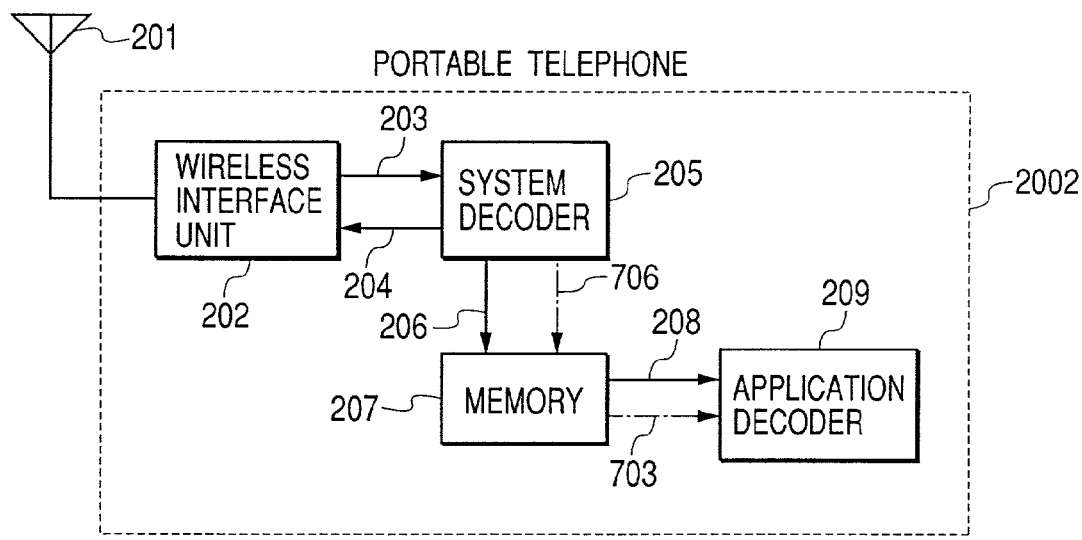
FIG. 17 is a diagram showing internal arrangement of a portable telephone provided with function to output error indication data.
Figure 43:
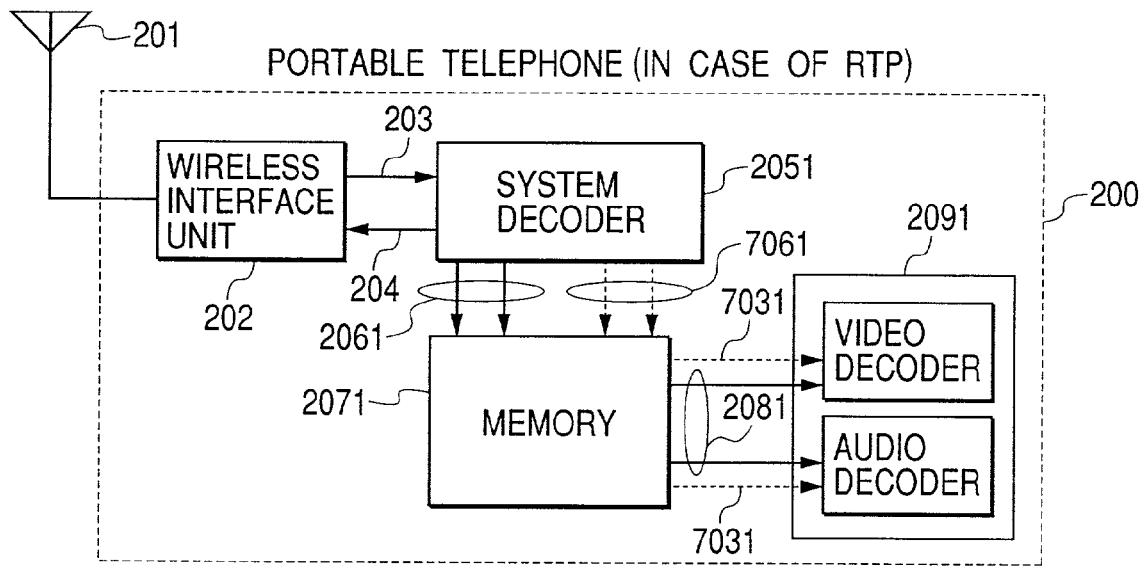
FIG. 43 is a diagram showing internal arrangement of a portable telephone provided with function to output error indication data when RTP is used.
Figure 44:
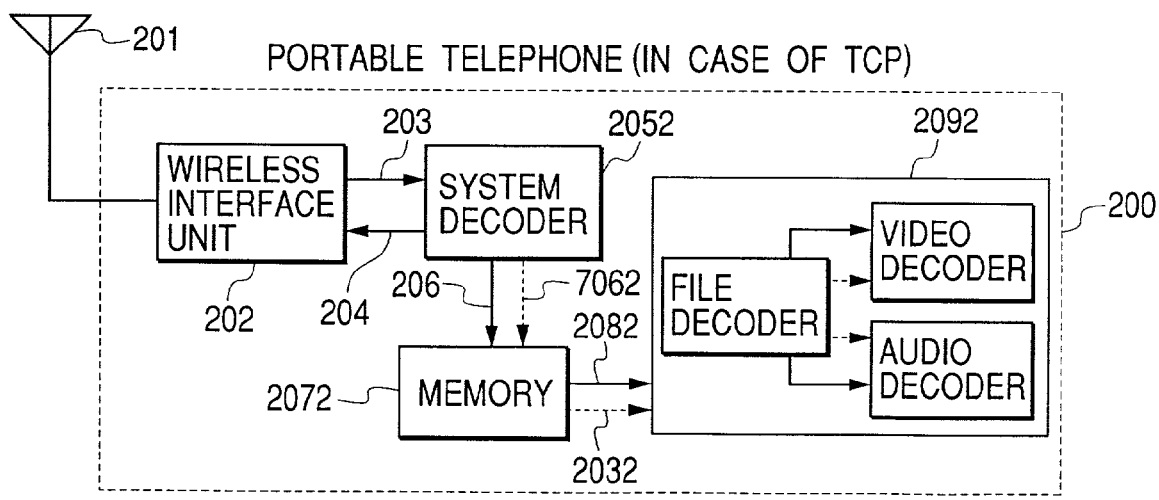
FIG. 44 is a diagram showing internal arrangement of a portable telephone provided with function to output error indication data when TCP is used.

FIG. 16 shows a method to prepare error indication data of the same size as the media data. Each binary data in the error indication data is corresponded to each binary data in the media data on 1:1 basis. For instance, 1 is allocated to interval of the insertion data 8053 in the media data, and 0 is allocated to a internal of a packet compliant to the specification of decoder. By this error indication data, the application decoder can accurately detect the packet loss. In this case, the insertion data 8053 is not necessarily be a unique word. However, it is necessary to have a structure to deliver the error indication data to the application decoder. For instance, as shown in FIG. 6, the error indication packet 706 generated at the packet loss detection unit 802 is outputted from an error indication output unit 804 to a memory 207. In this case, the entire structure of the portable telephone is as shown in FIG. 17. FIG. 17 is different from FIG. 2 in that the error indication data packet 706 is delivered from a system decoder 205 to the memory 207, and that, after it is stored in the memory 207, the error indication data 703 is outputted to the application decoder 209 in synchronization with the media data. FIG. 43 and FIG. 44 each represents a diagram showing structure where function of an error indication data is added to the portable telephone in FIG. 38 and FIG. 39 respectively. In the structure of FIG. 43 using RTP, an error indication packet 7061 and an error indication data 7031 are processed for each payload type. In contrast, in the structure shown FIG. 44, where TCP is used and TCP packet does not have payload type, the error indication data is distributed to the media decoder by file decoder in the application decoder. In FIG. 44, in case packet loss occurs at the header part of the file format data, the information at the header part must be corrected by the file decoder. However, in order to perform the decoding process in more reliable manner, retransmission request should be sent repeatedly at retransmission judgment unit 304 showing in FIG. 6 or FIG. 41 until the data arrives when loss packet occurs at the file header part, or the structure of the file should be predetermine between the transmission side and the terminal side.

In the above, description has been given on the method to tell the outbreak of packet loss to the media decoder. According to this method, reconstructed image quality and reconstructed sound quality to be depend ultimately upon performance characteristics of the application decoder. For this reason, when the application decoder itself does not have high-performance error correction algorithm, the insertion data for error correction may reduce performance characteristics of the decoding on the contrary. In order that the application decoder has high-performance error correction algorithm, it is necessary to add processing such as error detection, error concealment, etc. to the application decoder, and the processing amount should also be increased. In this respect, at a communication terminal where there are strict demands on memory request, CPU power, and power consumption, only simple error correction may be adopted for achieving real-time decoding. In the present application, it is proposed to adopt a method to correct the media data with packet loss to a data to comply with the specification or the standards of video, audio, etc in the service of file transfer type, before processing is performed at the application decoder using the insertion data for error correction.

Figure 18:
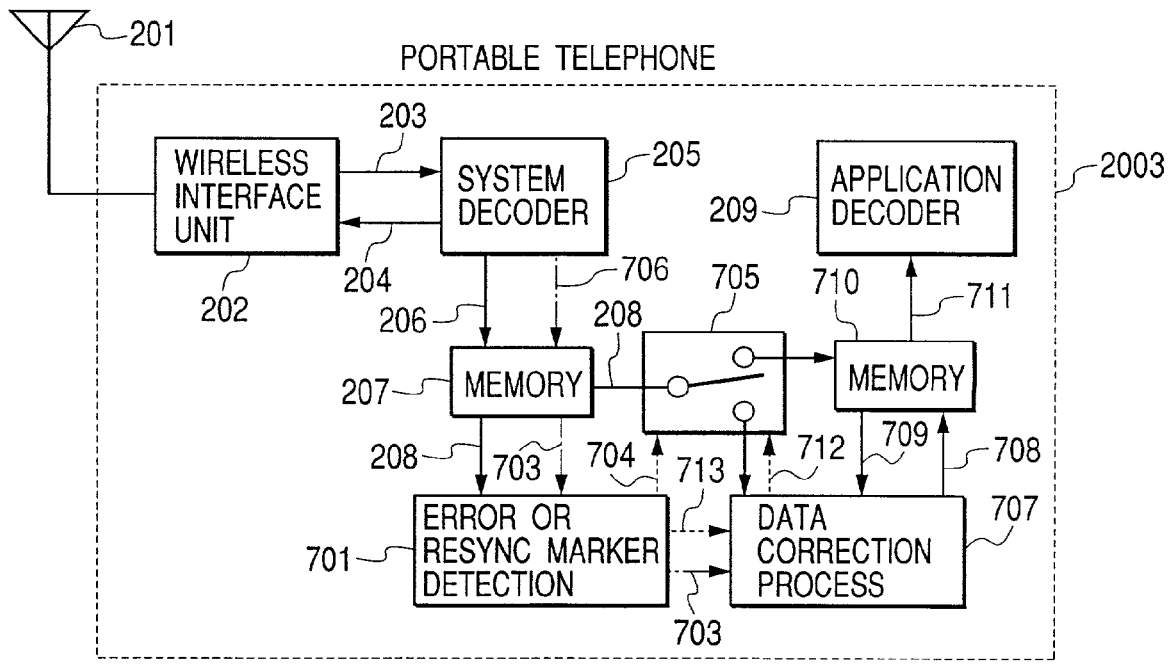
FIG. 18 is a diagram showing internal arrangement of a portable telephone to achieve data correction processing of the present invention.

FIG. 18 shows a portable telephone 2003. Here, the structure of correction process of media data is added to the portable telephone 2002 of FIG. 17. Description will be given now on the processing after input of the media data to the memory 207. At an error resync marker detection unit 701, the identification code (resync marker) for maintaining synchronization as defined in the standards of media processing and the insertion data for error detection 805 inserted in the system decoder 205 are retrieved sequentially from the media data 208 in the memory 207. (In case the error indication data explained in FIG. 16 is used, the error indication data 703 is also retrieved in parallel, and a data string indicating error position described in the error indication data is detected instead of the insertion data for error detection in the media data.) When any one of the above has been detected, an identification information 713 indicating whether detection result is resync marker or the insertion data for error detection (data string indicating error position as described in the error indication data when the error indication data is used) is delivered to the data correction processing unit 707. In this case, a control information 704 is delivered to a switch 705 at the same time. The control information 704 is an information to indicate whether the data from starting point of retrieving to the detection point should be outputted to a second memory 710 or a data correction processing unit 707. In case the detection result is a resync marker, the data is outputted to the second memory 710. In case the detection result is the insertion data for error detection (data string indicating error position as described in the error indication data when the error indication data is used), the data is outputted to the data processing unit 707. The switch 705 is controlled according to a value of the control information 704 so that the media data from the starting point for retrieving to the next resync marker is to be delivered to the second memory 710 or the data correction processing unit 707. (When the error indication data is used and when the detection result is a data string indicating error position as described in the error indication data, the error indication data 703 corresponding to the media data is also delivered to the data correction processing unit 707 at the same time.) Then, at the memory 207, the data from starting point for retrieving to the data point detected by an error—resync marker detection unit 701 is deleted. (Or, a pointer is shifted to the detectrd position. The same processing is performed for the error indication data). At the data correction processing unit 707, input data is checked, and the data is corrected to comply with the standard specification, and it is outputted to the second memory 710. In this case, a switch control information 712 may be delivered from the data processing correction unit 707 to the switch 705. (See below for the details.) When the data correction processing unit 707 requires the data already delivered to the second memory 710 for correction, the processed data 709 are retrieved and obtained from the second memory. The second memory 710 outputs the media data 711 to the application decoder 209 in response to the request from the user. In this case, the application decoder 209 does not need high-performance error correction. (When the error indication data is used and the application decoder is designed to receive the error indication data, the error indication data may be delivered to the application decoder.)

In the data correction as described above, when the media data is already divided to video data and audio data at the system decoder, correction process could be performed for each individual media data. However, when a plurality of media data are unified into a single file as in case of MP4, different correction process is needed to be carried out depending on data position in the file. More concretely, correction process is performed individually to each media data part (video data and audio data) and the file header part in the file. Then, it is necessary that data capacity described in the file header part is rewritten according the correction of the media data part. Thus, by correcting the file header to a data compliant to the specification of file format, the file format decoder can allocate each of the media data to the corresponding decoder.

Figure 23:
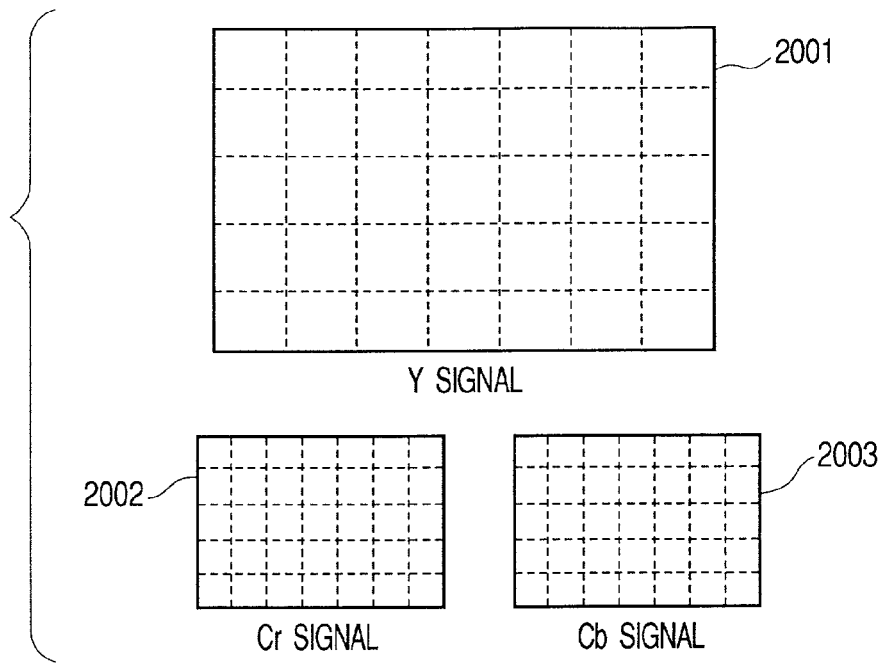
FIG. 23 shows macroblock division in MPEG-4 video coding.
Figure 24:
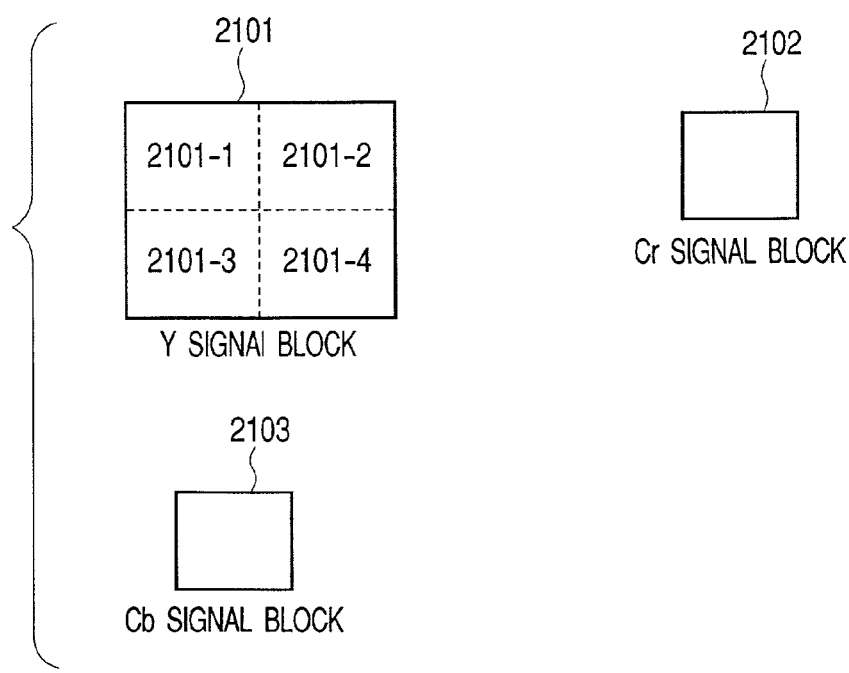
FIG. 24 shows arrangement of macroblock in MPEG-4 video coding.

Next, by taking an example on the MPEG-4 video standard, detailed description will be given on the processing at the data correction processing unit 707. Prior to the explanation, decoding system of the MPEG-4 video standard and data structure will be described. One frame of video image handled by MPEG-4 comprises a luminance signal (Y signal: 2001), and two chrominance signals (Cr signal: 2002; Cb signal: 2003) as shown in FIG. 23. Image size of the chrominance signal is ½ of the luminance signal in both horizontal and vertical coefficients. According to the MPEG-4 video standard, each frame of the video image is divided to small blocks as shown in FIG. 23, and decoding processing is performed in block unit called macroblock. FIG. 24 shows a structure of the macroblock. The macroblock comprises a Y signal block 2101 of 16×16 pixels, and a Cr signal block 2102 of 8×8 pixels and a Cb signal block 2103 being in spatial concurrence. In the decoding process of the macroblock, Y signal block is divided to four blocks of 8×8 pixels (21011, 21012, 21013, and 21014) in any case and are processed. Coding algorithm of MPEG-4 video is called MC-DCT (motion compensation-discrete cosine transform), and decoding process is carried out based on macroblock as given above. Motion compensation means a method to extract a position similar to the content of current macroblock from the previous frame and to encode motion vector. Differential block images between a block region of the previous frame extracted by the motion compensation and coded blocks (21011, 21012, 21013, 21014, 2102, and 2103) of the original image is subjected to frequency transform, and each transform coefficient is quantized and encoded. More concretely, the MPEG-4 video standard includes intra-frame coding (intra coding), inter-frame coding (predictive coding), and bidirectional coding. The intra-coding is a data compression method to perform DCT directly, not to a differential block image after motion compensation, but to the inputted block image and to quantize and encode each DCT coefficient. A frame, in which intra coding is applied to all macroblocks is called I-VOP (Intra-coded Video Object Plane; In case of rectangular image, VOP is the same as a frame). I-VOP does not require decoding information of the past frames, and it is used as decoding start frame at random access. Predictive coding is a compression method using MC-DCT. In particular, it is a coding method to perform MC (motion compensation) to previous frame in display order. In contrast to the macroblock in the frame, a frame processed by predictive coding or intra-coding is called P-VOP (Predictive-coded VOP). In addition, there is also a method to perform MC using the previous and the future frames (bidirectional coding). A frame using this coding method is called B-VOP (Bidirectionally predicted-coded VOP).

Figure 19:
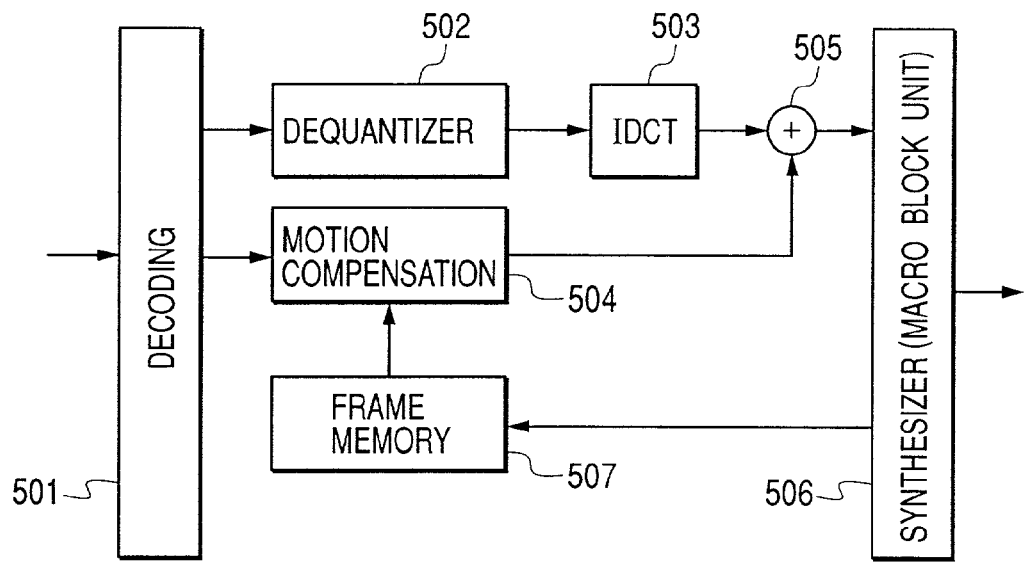
FIG. 19 is a diagram showing an example of a block diagram of MPEG-4 decoder.

FIG. 19 is a block diagram showing MPEG-4 video decoding as generally practiced. The inputted media data is converted to a decoded information with some meaning from a binary code by a decoding unit 501. Then, an information relating to quantization data of DCP coefficient is sent to a dequantizer 502 and is decoded to DCT coefficient data. Then, it is reconstructed to a differential macroblock image by an inverse DCT unit 503. On the other hand, an information relating to motion vector is sent to a motion compensation unit 504. At the motion compensation unit 504, a predictive macroblock image is reconstructed according to the decoded motion vector and previous reconstructed frame stored in the frame memory 507. From the reconstructed differential macroblock image and the predictive macroblock image, a reconstructed macroblock image is generated by an adder 505, and it is synthesized to a reconstructed frame image at a synthesizer 506. The reconstructed frame image is outputted to a display processing unit, and it is stored in the frame memory for motion compensation of the next frame.

Figure 20:
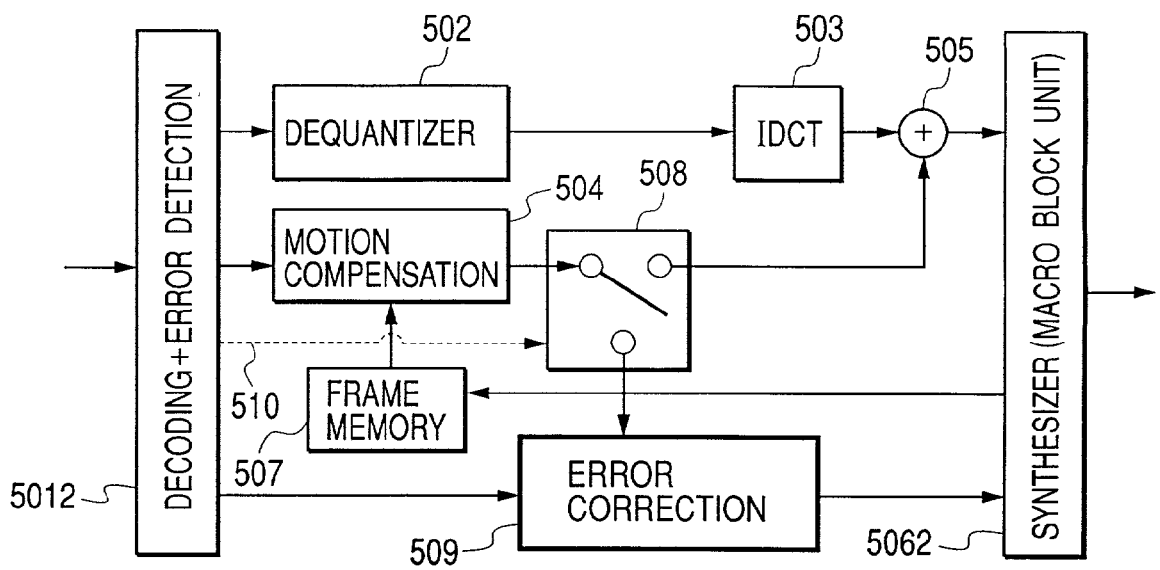
FIG. 20 is an example of a block diagram of MPEG-4 decoder provided with error correcting function.

FIG. 20 is a block diagram of MPEG-4 video decoding with functions of error detection and error correction processing. At a decoding and error detection unit 5012, analysis of the input data and the error detection are performed. For error detection, there are various methods. In general, it is carried out by detection of variable length code, which is not present in the code book of MPEG-4 video coding. When data error is detected, the decoding and error detection unit 5012 outputs the data to the error correction unit 509. Also, the decoding and error detection unit 5012 delivers an output control information 510 of the predicted macroblock image to a switch 508 when the data error has been detected. Then, it controls in such manner that the predicted macroblock image is delivered to the error correction unit 509. Because both of the processing of error detection at the decoding and error detection unit 5012 or the processing at the error correction unit 509 is not standardized, the reconstructed image quality of the data containing transmission error depends on the specification of each product.

Figures 21, 22:
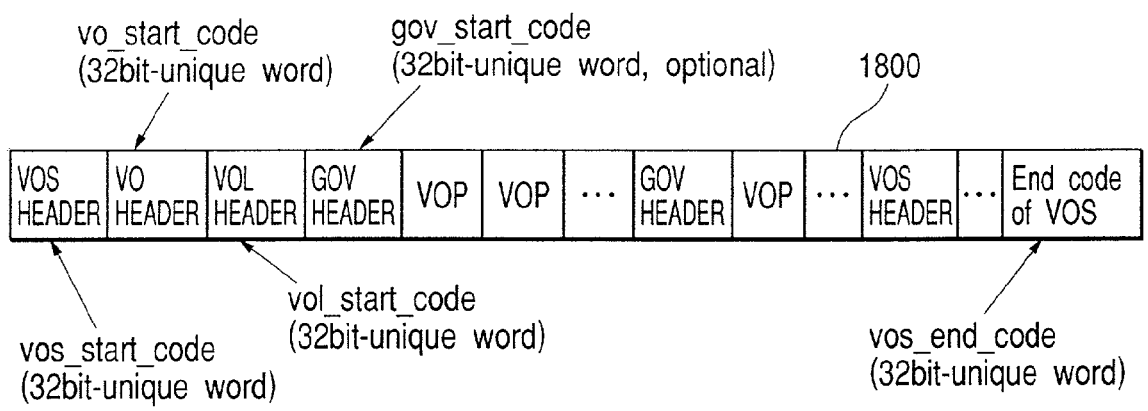
FIG. 21 shows an example of MPEG-4 video coding bit stream.
FIG. 22 shows data arrangement of a VOP header in MPEG-4 video coding bit stream.

FIG. 21, FIG. 22 and FIG. 25 each represents a basic data structure of MPEG-4 video coding. FIG. 21 shows the entire data structure, FIG. 22 represents data structure of frame header, and FIG. 25 shows data structure of each macroblock. In FIG. 21, VOS header contains profile level information to determine application range of MPEG-4 video product, VO header contains version information to determine data structure of MPEG-4 video coding, and VOL header contains information such as image size, coding bit rate, frame memory size, application tool, etc. Each of these is essential information for decoding of the received encoded data. GOV header contains time information. This is not an essential information and may be omitted. Each of VOS header, VO header, VOL header, and GOV header begins with a 32-bit unique word and can be easily retrieved. "End code of VOS" indicating the end of the sequence is also a 32-bit unique word. Each of these unique words begins with 23 "0"s and one "1", and 2-byte data following the 24 bits indicates the type of each data interval. VOP contains data of each frame (called VOP in MPEG-4 video). VOP begins from VOP header shown in FIG. 22 and has such a structure that macroblock data having structure shown in FIG. 25 are aligned downward from above and from left to right. FIG. 22 shows data structure of VOP header. It begins with a 32-bit unique word called VOP start code. vop_coding_type represents coding type of VOP (such as I-VOP, P-VOP, B-VOP, etc.), and modulo_time_base and vop_time_increment following it each represents a timestamp to indicate output time of VOP. modulo_time_base is information of unit of one second, and vop_time_increment is an information of unit of less than one second. An information relating to accuracy of vop_time_increment is indicated in vop_time_increment resolution of VOL header. The information modulo_time_base is a value to indicate variation between a value in unit of second of the previous VOP and a value of the current VOP in unit of second, and "1" is encoded as many times as the variation. Specifically, "0" is encoded in case the time in second is the same as the previous VOP, "10" is encoded in case it is different for one second, and "110" is encoded in case it is different for 2 seconds. The information vop_time_increment indicates the information of less than one second in each VOP with an accuracy indicated by vop_time_increment_resolution. The intra_dc_vlc_thr contains information to identify whether DC coefficient of DCT in intra-coded macroblock is encoded in coding table different from coding table for AC coefficient or it is encoded by the same coding table. From the value of intra_dc_vlc_thr and quantization accuracy of DCT coefficient in each macroblock, it is selected which of coding tables is to be used for macroblock. vop_quant is a value to indicate quantization accuracy when DCT coefficient is quantized, and it is the initial value for quantization accuracy of the frame. vop_fcode_forward and vop_fcode_backward indicate the maximum range of the motion vector in MC. FIG. 25 shows basic data structure (I-VOP and P-VOP) of macroblock. not_coded is a 1-bit flag used only in P-VOP, and it indicates whether or not the data relating to the macroblock follows after it. In case it is "0", it means that the data relating to the macroblock follows. In case it is "1", the data following it is the data relating to the next macroblock, and it indicates that decoding macroblock is generated by copying from the same position as the prvious frame. mcbpc is a variable length code of 1 to 9 bits, and it represents mb_type and cbpc by a code. The mb_type indicates a coding type of its macroblock. The cbpc indicates whether there is quantization DCT coefficient (a value other than 0) to be encoded in each of the two chrominance blocks (in case of intra-coding block, and it indicates whether there is AC coefficient of quantization DCT coefficient or not.) Coding types indicated by mb_type include 5 types, i.e. intra, intra+q, inter, inter+q, inter4v (inter4v indicates that the unit to perform motion compensation of luminance signal is not 2101 in FIG. 24, but it is four small block from 21011 to 21014.) and stuffing. The codes intra and intra+q each indicates intra-coding. The codes inter, inter+q and inter4v each indicates predictive coding, and stuffing indicates that it is a dummy data to adjust coding rate. The symbol "+q" indicates that quantization accuracy of DCT coefficient is changed from the value of the preceding macroblock (quant) or the initial value (vop_quant; to be applied to the first coding macroblock of the frame). In case of stuffing, the data after ac_pred_flag in FIG. 25 are omitted, and the values of decoded mcbpc and not_coded are not reflected in the synthesis of the reconstructed image. The code ac_pred_flag is an information contained only when mb_type is intra-coding, and it indicates whether prediction from the surrounding blocks should be performed or not with respect to AC coefficient of DCT. In case this value is "1", a part of the quantized reconstructed value of AC coefficient is a differential value from reconstructed AC coefficient the surrounding blocks. cbpy is a variable length code of 1 to 6 bits, and it indicates whether or not there is encoded quantization DCT coefficient (value other than 0) in each of four luminance blocks. (Similarly to cbpc, it indicates whether or not there is AC coefficient of quantization DCT coefficient in case of intra-coding block.) The code dquant is present only when mb_type is intra+q or inter+q, and it indicates a differential value from the value of quantization accuracy of the preceding macroblock, and quant+dquant is turned to quant of the macroblock. The information relating to the coding of motion vector is contained only when mb_type is for predictive coding. Differential intra DC coefficient is an information contained only when mb_type is intra-coding and use_intra_dc_vlc is "1". In DC coefficient of DCT in intra-coding block of MPEG-4 video, a differential value from DC coefficient of DCT in the surrounding macroblocks is quantized. The method of quantization is also different from AC coefficient, and a coding method different from that of AC coefficients is prepared. However, by turning use_intra_dc_vlc to 0, it is possible to apply the same coding method as quantization value of AC coefficients to quantization value of DC coefficient. The value of use_intra_dc_vlc is determined by intra_dc_vlc_thr decoded at VOP header and by quant of the macroblock. Regarding Intra AC coefficient or Inter DC&AC coefficient, only the block, which is "indicated that there are values other than 0 in quantization coefficient of DCT by cbpy and cbpc", has this information.

In the macroblock data structure of FIG. 25 as described above, if synchronization of data is lost once due to influence from the causes such as transmission error, data synchronization cannot be restored up to the start code of the next frame. In this respect, in the MPEG-4 video standard, data structure of error resilience is optionally provided. More concretely, video packet and a processing called data partitioning division are prepared, and the application of these tools is specified at VOL header. The video packet is a unit of coding data with several macroblocks being put together. At the beginning of each video packet data, resync marker and video packet header including macroblock position in the frame are arranged. Also, prediction of the data between the neighbor macroblocks is closed in the packet. Thus, even in case data synchronization has been lost, its influence can be limited within a single packet, and synchronization can be restored at the beginning of the next video packet. FIG. 26 shows an example of video packet division. In FIG. 26, it is divided to 5 video packets of 2301, 2302, 2303, 2304, and 2305. Except a first packet 2301 of the frame, a video packet header shown in FIG. 28 is arranged at the beginning of each packet data. For the first packet of the frame, VOP head of FIG. 22 is provided at the beginning. Data structure of the packet header begins with resync marker called resync_marker. This resync marker is a unique word of 17–23 bits, and its data size is uniquely determined from the coding type of the frame and from the range of motion vector for motion compensation. The code macroblock_number indicates macroblock position in the frame on the first coding macroblock in the video packet. By these two data, synchronization is completely restored. quant_scale is an initial value of quantization accuracy of DCT coefficient in the video packet. This value is applied as quant of the preceding block to the first coding macroblock of the video packet. The code header_extension_code is a 1-bit flag to indicate whether the data from modulo_time_base to vop_fcode_backward is to be included in the video packet header or not. In case it is 1, modulo_time_base and the data following this are included. The data of modulo_time_base and after are defined to have the same values as those of VOP header, and it plays a role to check whether the information in VOP header is under influence of transmission error or not. In contrast, data partitioning is defined as a function to reduce the probability of important data of each macroblock to be undecodable due to transmission error by rearranging position of the code macroblock structure as explained in FIG. 25 in the video packet.

Figure 30:
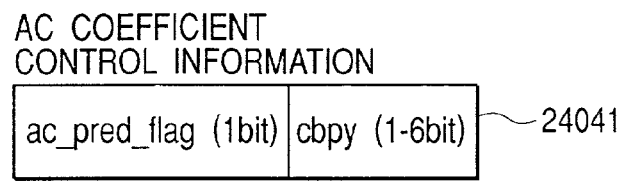
FIG. 30 represents data structure of a video packet AC coefficient control information in MPEG-4 video coding bit stream.
Figure 31:
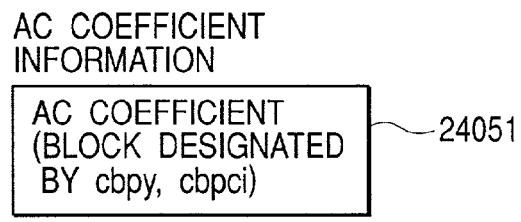
FIG. 31 represents data structure of a video packet AC coefficient information part in MPEG-4 video coding bit stream.

FIG. 27 shows data partitioned structure in the video packet in case the frame type is I-VOP. The data structure of a video packet header 2401 in FIG. 27 is the same as already explained in connection with FIG. 28. FIG. 29 represents a data structure 24021 of a priority data part for 1 macroblock regarding the data arranged in a priority data part 2402 shown in FIG. 27. It means that the data shown in FIG. 29 is an extraction of only the data which are important for synthesis of decoding block from the macroblock data shown in FIG. 25. In the priority data part 2402 of FIG. 27, only the data shown in FIG. 29 is extracted for each macroblock in the video packet, and these are arranged sequentially. However, dquant and differential Intra DC coefficient are present only in the macroblock, which meets the condition shown in the figure. A dc_marker 2403 in FIG. 27 is a unique word of 19 bits. FIG. 30 shows a data structure 24041 of AC coefficient control information part for 1 macroblock regarding the data arranged in AC coefficient control information 2404. FIG. 31 shows a data structure 24051 of AC coefficient information part for 1 macroblock for the data arranged in AC coefficient information 2405 of FIG. 27. In each of these cases, only the data shown in FIG. 29 or FIG. 30 are extracted from the macroblock data shown in FIG. 25 for each macroblock in the video packet, and these are arranged sequentially. However, the presence of AC coefficient information in each macroblock is changeable according to the values of cbpy and cbpc. With the structure as described above, even when transmission error occurs at 2404 or 2405, it is judged whether the priority data part 2402 is decodable without synchronization failure by the decoding of dc_marker. As a result, by using only the data of the priority data part, it is possible to synthesize block image reconstructed approximate feature for all macroblocks in the video packet. Also, even when transmission error occurs at the priority data part 2402, it is possible to restore synchronization in the video packet by retrieving dc_marker. However, when the data at the priority data part is in failure, even when there is no transmission error in the AC coefficient control information part 2404 and the AC coefficient information part 2405, the information such as mb_type, cbpc or dquant cannot be used, and this means that accurate decoding is not necessarily achieved.

Figure 32:
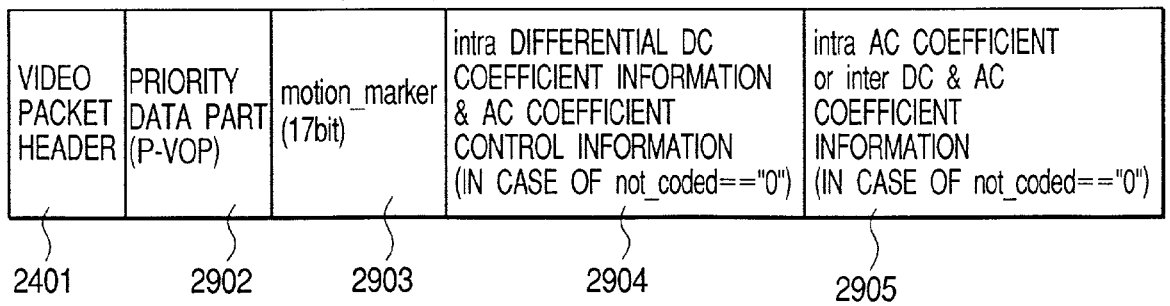
FIG. 32 represents data structure of a video packet data (P-VOP) in MPEG-4 video coding bit stream.

FIG. 32 represents a data partitioned structure in a video packet in case the frame type is P-VOP. The data structure of the video packet header 2401 in FIG. 32 is as shown in FIG. 28. FIG. 33 shows a data structure 29021 in the priority data part for 1 macroblock regarding the data arranged in the priority data unit 2902 of FIG. 32. It means that the data of FIG. 33 is an extraction of only the data which are important for synthesis of decoding block from the macroblock data shown in FIG. 25. In the priority data part 2902 shown in FIG. 32, only the data shown in FIG. 33 is extracted for each macroblock in the video packet, and these are arranged sequentially. However, for the macroblock where the value of not_coded is 1, mcbpc and motion vector information are omitted. For the macroblock where mb_type is intra-coding or stuffing, motion vector information is omitted. The motion_marker 2903 in FIG. 32 is a unique word of 17 bits. FIG. 34 shows a data structure 29041 of differential Intra DC coefficient information &AC coefficient control information for 1 macroblock regarding the data arranged in differential Intra DC coefficient information &AC coefficient control information 2904 of FIG. 32. FIG. 35 shows a data structure 29051 of Intra AC coefficient or Inter DC&AC coefficient information for 1 macroblock regarding the data arranged in Intra AC coefficient or Inter DC&AC coefficient information 2905 of FIG. 32. In each of these cases, only the data shown in FIG. 34 or FIG. 35 are extracted from the macroblock data shown in FIG. 25 for each macroblock in the video packet, and these are arranged sequentially. However, for a macroblock where not_coded is 1, there is no data as shown in FIG. 34 and FIG. 35 in the macroblock data interval, and it is omitted. Also, ac_pred_flag, dquant and differential Intra DC coefficient arranged in differential Intra DC coefficient information &AC coefficient control information 29041 in each macroblock are present only in the macroblock, which meets the condition as shown in the figure. Further, the presence of Intra AC coefficient (in case mb_type is intra-coding) or Inter DC&AC coefficient information (in case mb_type is predictive coding) is changeable according to cbpy and cbpc.

Figure 36:
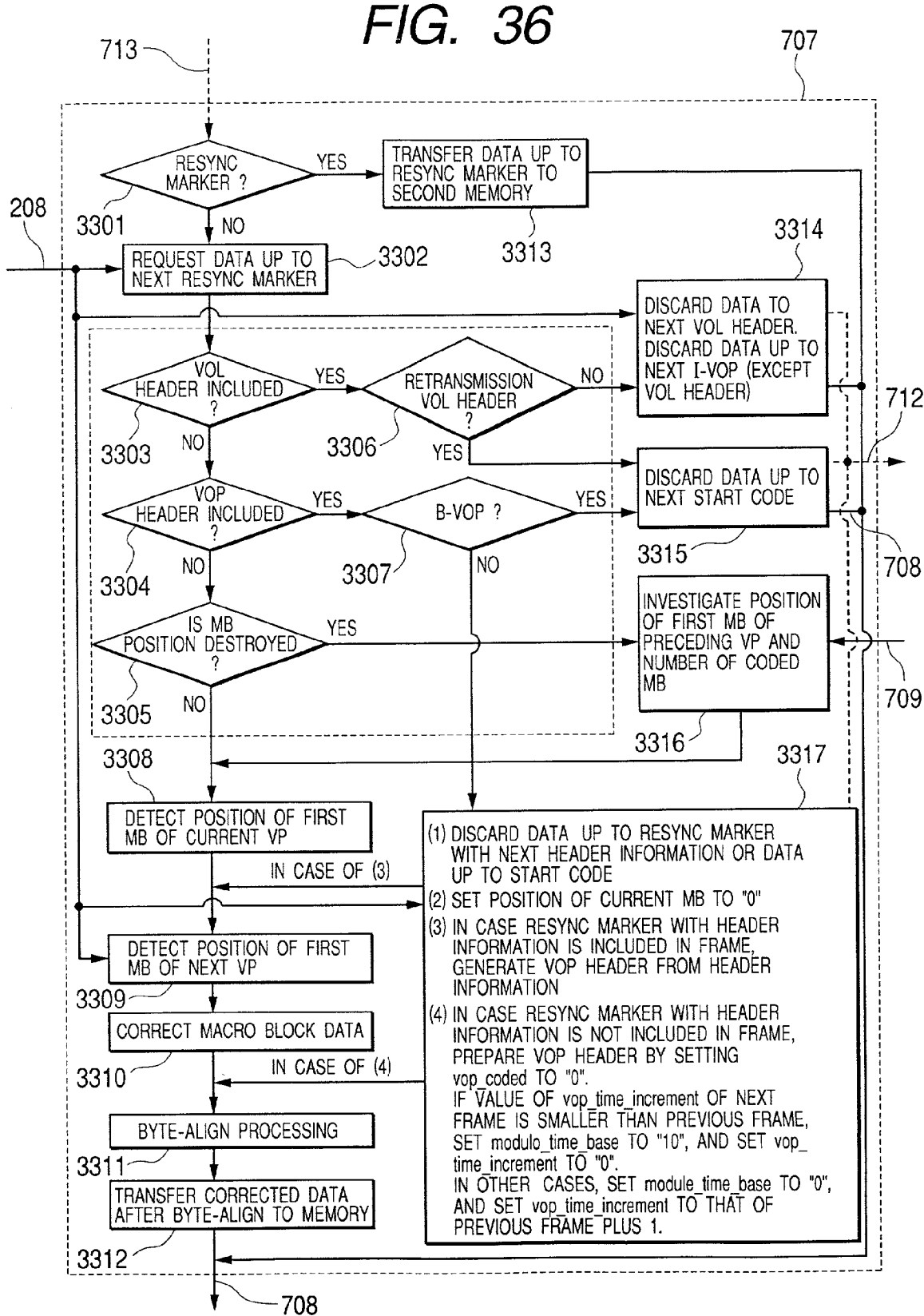
FIG. 36 is a flow chart showing media data correction algorithm according to the present invention.

FIG. 36 shows processing at the data correction processing unit 707 by taking an example the data using on the video packet and data partitioning function. First, an identification information 713 indicating whether the result of data retrieving is resync marker (various start codes or resync_marker) or insertion data for error detection is received from an error—resync marker detection unit 701 shown in FIG. 18, and it is judged whether the detection result is resync marker or not (Step 3301). In case the detection result is resync marker, the data from the starting point of retrieving to the detection point, i.e. the data for 1 video packet, are outputted to a second memory 710 by a control information 704 delivered to a switch 705 from the error—resync marker detection unit 701 of FIG. 18. At the data correction processing unit 707, an information indicating that the data inputted to the second memory 710 is stored is sent to the second memory 710, and the processing is completed (Step 3313). On the other hand, when the detection result is the insertion data for error detection, by the control information 704 to be delivered from the error—resync marker detection unit 701 of FIG. 18 to the switch 705, the media data 208 from the starting point of retrieving to the next resync marker is sent to the data correction processing unit 707 from the memory 207 (Step 3302). Next, at the data correction processing unit 707, the acquired media data 208 is analyzed, and the error interval is checked. This checking includes the following 5 steps: Is VOL header included in the error interval? (Step 3303) In case VOL header is not included in Step 3303, is VOP header included in the error interval? (Step 3304) In case VOP header is not included in Step 3304, is macroblock position data (macroblock_number in FIG. 28) in the video packet header included in the error interval? (Step 3305) In case VOL header is included in Step 3303, is the VOL header a retransmission header? (Step 3306) In case VOP header is included in Step 3304, is vop_coding_type a B-VOP? (Step 3307) Here, for Step 3307, in case vop_coding_type information in the VOP header is included in the error interval, vop_coding_type information (vop_coding_type of FIG. 28) included in the packet header in the frame is usable for the judgment. As the result of the error interval check, if it is judged that the retransmitted VOL header is included in the error interval in Step 3306, an error correction information 708 indicating that a combination of VOS header, VO header and VOL header is discarded is sent to the second memory 710 of FIG. 18, and the processing is completed (Step 3315). In this case, if VOS header and VO header are already delivered to the second memory 710, the second memory deletes the corresponding header information according to the error correction information 708. As the result of the error interval check, if it is judged that the first VOL header of scene is included in the error interval, the switch control information 712 is controlled in such manner that the media data up to the next VOL header not containing error are inputted to the data correction processing unit 707, and this information is delivered notified to the switch 705 of FIG. 18 (Step 3314). Then, the information up to the next VOL header and not including it is deleted, and only next VOL header information is delivered to the second memory as an error correction information 708. In case VOP after VOL header is not I-VOP, the switch control information 712 is controlled in such manner that the media data up to the next I-VOP are inputted to the data correction processing unit 707, and this information is delivered to the switch 705. Then, the data are deleted so that the type of VOP following first VOL is I-VOP. As the result of the error interval check, if it is judged that vop_coding_type is B-VOP in Step 3307, the switch control information 712 is controlled in such manner that the media data up to the next VOP header are inputted to the data correction processing unit 707, and this information is delivered to the switch 705 of FIG. 18, and then the data up to the next start code are deleted (Step 3315). As the result of the error interval check, if it is judged that vop_coding_type is not B-VOP, the following procedures (1)–(4) should be performed (Step 3317).

(1) The switch control information 712 is controlled in such manner that the data up to the next resync marker with header information or to the start code are discarded, and this information is delivered to the switch 705.
(2) The position of the current macroblock (macroblock_number) is set to 0.
(3) In case resync marker with header information is included in the frame, VOP header is generated from the header information.
(4) In case resync marker with header information is not included in the frame by setting vop_coded is turned to 0, VOP header is prepared. In case the value of vop_time_increment of the next frame is smaller than the previous frame, modulo_time_base is set to 10, and vop_time_increment is set to 0. In other cases, modulo_time_base is set to 0, and vop_time_increment is set to "that of the previous frame plus 1".

For the retrieving of resync marker with header information as shown in the procedures (3) and (4), the media data 208 in the memory 207 is used. When the procedure (4) is carried out, byte-align processing is performed at the end of the correction data (Step 3311). A byte-aligned correction data 708 is outputted to the second memory 710, and the processing is completed (Step 3312). As the result of the error interval check, if the macroblock position data in the video packet header is included in the error interval in Step 3305, a processed data 709 of the preceding video packet (VP) is extracted from the second memory, and macroblock_number in the preceding VP header and number of coding MB including the preceding VP are checked (Step 3316). By this processing, it is possible to decode macroblock_number of the VP header.

Figure 37:
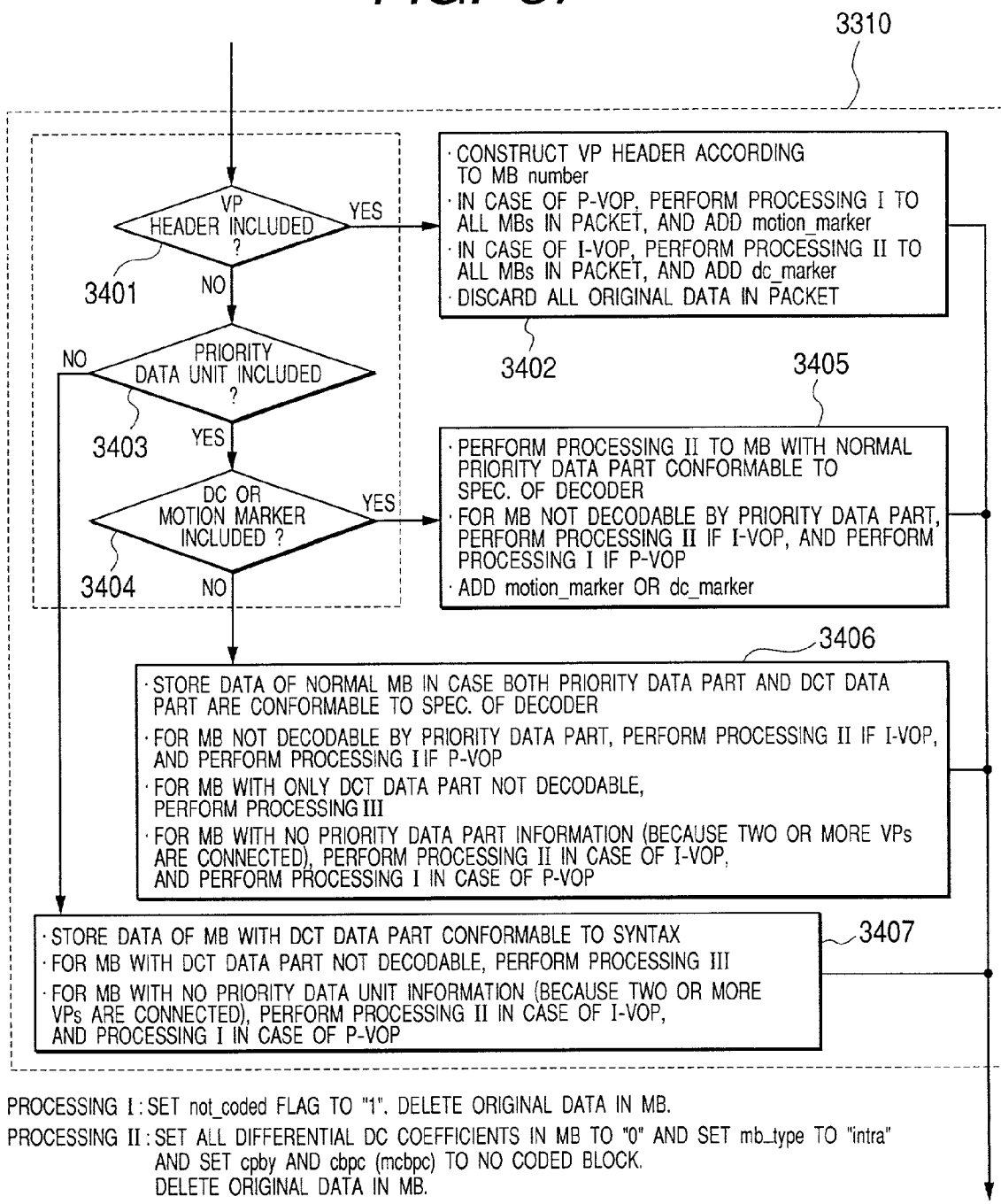
FIG. 37 is a flow chart showing macroblock data correction algorithm according to the present invention.

In the error interval processing, if the processings in Step 3303 and Step 3304 cannot be fulfilled, or if it is judged that VOP coding type is not B-VOP in Step 3307 and the processing (3) is executed in Step 3317, correction processing of macroblock data is performed. First, in case the processing of Step 3303 and Step 3304 is not fulfilled, the position of the first MB (macroblock_number) of the video packet is detected (Step 3308). In case the processing of Step 3304 is fulfilled, Step 3308 can be omitted because the position of the first MB of the video packet is set to 0 in the processing (2) in Step 3317. Next, the media data 208 in the memory 207 is searched, and the position of the first MB of the next VP, i.e. the number of coding MB in the current VP, is detected (Step 3309). As the result of retrieving, if the start code is detected before resync-marker of the next VP, it is judged that the final MB in the VP is the final MB of the VOP. Using coded macroblock number information in the video packet and the media data 208 in the video packet, macroblock data correction processing 3310 shown in FIG. 37 is performed. Finally, byte-align processing 3311 is performed at the end of the correction data. The byte-aligned correction data 708 is outputted to the second memory 710, and the processing is completed (Step 3312).

Next, description will be given on macroblock data correction processing 3310 as shown in FIG. 37. As the data correction method of each macroblock in the packet, the following three methods are used in the present specification.

Processing I: not_coded flag is set to 1. Initial data in MB are deleted.

Processing II: All differential DC coefficients in MB are set to 0, mb_type is set to "intra", and cbpy and cbpc are set to "no coding block". The initial data in MB are deleted.

Processing III: cpby and cbpc are set to "no coding block". Further, in case of I-VOP, ac_pred_flag is set to 0, and AC coefficient data are deleted. In case of P-VOP, if mb_type is intra-coding (intra, intra+q), Processing I is performed. If mb_type is predictive coding (inter, inter+q, inter4v), Inter DC&AC coefficient data are deleted.

The selection of the above processing procedures is determined depending on at which part in FIG. 27 or FIG. 32 the error has occurred. Then, the media data in the inputted video packet is checked, and the error interval is checked by the following three steps: Is video packet header (2401 of FIG. 27 or 2401 of FIG. 32) included in the error interval? (Step 3401) In case video packet header is not included in Step 3401, is the priority data part (2402 of FIG. 27 or 2902 of FIG. 32) included in the error interval? (Step 3403) In case the video packet header is included in Step 3403, is dc marker or motion marker (2403 in FIG. 27 or 2903 in FIG. 32) included in the error interval? (Step 3404)

In Step 3401, if it is judged that video packet header is included in the error interval, the processing Step 3402 is executed, and the processing is completed. More concretely, the video packet header part is corrected according to the position of the first MB detected by the processing of Step 3308 of FIG. 36. In this case, if quant_scale is included in the error interval, it is determined to the same value as the preceding VP packet. Next, data are generated for each MB in the video packet. As the generating method, Processing II is used in case the coding type of VOP is I-VOP or Processing I is used in case it is P-VOP. Further, dc or motion marker (dc_marker in case of I-VOP, and motion_marker in case of P-VOP) is added immediately after the priority data part. In this case, all original data in the packet are discarded, and only correction data are outputted.

In Step 3403, if it is judged that the priority data is not included in the error interval, the processing of Step 3407 is executed, and the processing is completed. More concretely, for MBs with DCT data part compliant to the specification of video standard (2404 and 2405 in FIG. 27, or 2904 and 2905 in FIG. 32), the data without error correction of the priority data part and DCT data part are stored. For MBs with DCT data part included in the error internal, the data are corrected by Processing III. In case resync_marker of the next VP header is included in the error internal, the VP detected by the processing of Step 3309 of FIG. 36 is actually VP after the next (two steps after). Therefore, it is necessary to process MBs in the next VP as MBs in the current VP. For MBs with no reconstructed information of the priority data part, MB data of the priority data part and the AC coefficient control information part (only in case of I-VOP) are generated using Processing II in case VOP coding type is I-VOP, or using Processing I in case it is P-VOP. "dc or motion marker" is inserted immediately after the priority data part.

In Step 3404, if it is judged that dc or motion marker is included in the error interval, the processing of Step 3405 is executed, and the processing is completed. More concretely, for MBs with priority data part compliant to specification of video standard, Processing III is performed. For MBs on I-VOP with the priority data part included in the error interval, Processing II is performed. For MB on P-VOP with the priority data part included in the error interval, data is corrected by Processing I. Further, dc or motion marker (dc_marker in case of I-VOP, and motion_marker in case of P-VOP) is inserted immediately after the priority data part.

In Step 3404, if it is judged that dc or motion marker is not included in the error interval, the processing of Step 3406 is executed, and the processing is completed. More concretely, for MBs with the priority data part and the DCT data part both in the condition compliant to the specification, the data of the priority data part and the DCT data part are stored without error correction. For MBs with only the priority data part included in the error interval, MB data of the priority data part and the AC coefficient control information part (only in case of I-VOP) are corrected by Processing II in case VOP coding type is I-VOP, or by Processing I in case it is P-VOP. For MBs with only DCT data part included in the error interval, the data are corrected by Processing III. In case the data up to resync_marker of the next VP header is included in the error interval, the VP detected by the processing of Step 3309 of FIG. 36 is actually VP after the next (two steps after). Therefore, it is necessary to process MBs in the next VP as the MBs in the current VP. For MBs with no information of priority data part as such because of transmission error, MB data of the priority data part and AC coefficient control information part (only in case of I-VOP) are generated by Processing II in case VOP coding type is I-VOP, or by Processing I in case it is P-VOP.

As described above, the function to correct the data error is performed as the starting point which is start code, resync marker, dc marker or motion marker. Therefore, by designing in such manner that these unique words are used as starting point of error correction and transmission packet is arranged on the transmission side so that dc or motion marker and DCT data part are not included in one packet, the method of the present invention works more effectively.

The following cases are also included in the present invention:

First, the method to insert the insertion data for error detection according to the present invention can be used in communication means associated with packet loss. And if a protocol including sequence number (the order to synthesize packets) of packets in the header of each packet is used, the invention can be applied regardless of whether it is unreliable type or reliable type with transmission terminal. Therefore, the method to insert the insertion data for error detection of the present invention is not limited to TCP and UDP/RTP as described in the present specification. Also, even in case of circuit switching method, since transmission error can be corrected at a predetermined interval, the result of error correction can be reflected to the application decoder output. Thus, in case it is judged that communication error could have occurred at a specific part of the received data, the method to insert the insertion data for error detection of the present invention can be applied.

Secondly, the method to insert the insertion data for error correction of the present invention is characterized in that an identification code indicating the position of data error caused by influence of packet loss to the application decoder is explicitly inserted in the media data. Therefore, values of identification code are not limited to those values shown in FIGS. 1, 15 and 16. The insertion data generation scheme and insertion scheme to judge the data of the packet loss section as an error by the application decoder is included in the present invention. Also, method and structure for detecting position of insertion are not limited to those shown in FIG. 2 and FIG. 6.

Thirdly, the method for media data correction of the present invention is characterized in that media data (i.e. video or audio data) under influence of transmission error such as packet loss are decoded and are corrected to comply with specification and standards for reconstruction before the data are inputted to the application decoder. In the present specification, description has been given by taking an example on the MPEG-4 video standard, while data correction can be carried out in other methods of video coding. The invention can be executed in various types of still image coding system, audio coding system and data coding system or file format for media combination such as MP4. Therefore, all methods to correct the data to that to comply with specification or standards before the data are inputted to the application decoder (video decoder, audio decoder, scene description decoder, file format decoder, and combination of these) are included in the present invention. Also, the structure to execute the present invention is not limited to that of FIG. 18. For instance, a method to correct the data with error and to rearrange them using only one frame memory or a method to include error detecting function in the data correction processing unit are also covered by the present invention.

Fourthly, description has been given on the portable telephone in the present specification, while the present invention can be executed in other types of wireless terminals or delivery servers. For instance, it is effective to apply the data correcting method of the present invention to a conversion unit or a converter to convert the data from wireless communication use to wired communication use.

According to the present invention, it is possible to accurately detect position of data influenced by packet loss by the application decoder. Also, by correcting media data to comply with specification and standards of the decoder before the data are inputted to the application decoder, it is possible to reduce the burden on error correction processing in the application decoder and to speed up the data decoding.

The foregoing invention has been described in terms of preferred embodiments. However, those skilled, in the art will recognize that many variations of such embodiments exist. Such variations are intended to be within the scope of the present invention and the appended claims.

What is claimed is:

1. A data correction method comprising steps of:
inputting a data stream of encoded data generated according to a coding syntax;
detecting an infonnation indicating a position of data error in the inputted data stream;
generating an error detection data corresponding to the detected information of data error position;
outputting the inputted data stream with the generated error detection data to an error correction processor;
identifying a type of a data in the inputted data stream, which corresponds to the error position indicated by the error detection data;
correcting the data error in the inputted data stream according to the identified type and complying with the coding syntax, thereby providing a corrected data stream complying with the coding syntax; and
outputting the corrected data stream to a decoder for decoding data included in the corrected data stream.

2. A data correction method according to claim 1, wherein the correcting step including steps of:
judging whether the error interval includes a first stream header;
deleting the first stream header data and data following the first stream header up to a subsequent stream header, if the error interval includes the first stream header, and the subsequent stream header does not contain any error such that data following the subsequent stream header is decodable.

3. A data correction method according to claim 1, wherein the correcting step including steps of:
judging whether the error interval includes a first frame header indicating bidirectionally predicted-coded frame;
deleting the first frame header and first frame data following the first frame header up to a start code of a subsequent frame, if the error interval includes the first frame header.

4. A data correction method according to claim 3, if the error interval does not include the first frame header, further comprising the steps of:
generating a substitute frame header using the subsequent frame header in a video packet data, if the first frame data including an error has a video packet data, which is data of a plurality of macroblocks with a frame header; and
setting a substitute frame including the error as a frame without encoded data and setting time information, if the first frame data including the error does not have a video packet data.

5. A data correction method according to claim 1, wherein the correcting step including steps of:
judging whether the error interval includes a first stream header and a first frame header which indicates bidirectionally predicted coded frame of a first video packet;
investigating a position of a macroblock and a number of encoded macroblocks of a subsequent video packet or both of the subsequent video packet and a preceding video packet, if the error interval includes both of the first stream header and the first frame header; and
correcting a position of a macroblock and a number of encoded macroblocks of the first video packet using the invested data.

6. A data correction method according to claim 5, wherein the macroblock correcting step includes setting a flag indicating that there is no encoded data in the macroblock of the first video packet.

* * * * *